US012008744B2

(12) United States Patent
Peshlov et al.

(10) Patent No.: US 12,008,744 B2
(45) Date of Patent: Jun. 11, 2024

(54) MAPPING FIELD ANOMALIES USING DIGITAL IMAGES AND MACHINE LEARNING MODELS

(71) Applicant: Climate LLC, San Francisco, CA (US)

(72) Inventors: Boyan Peshlov, Chesterfield, MO (US); Weilin Wang, Ballwin, MO (US)

(73) Assignee: CLIMATE LLC, St. Louis, MO (US)

( * ) Notice: Subject to any disclaimer, the term of this patent is extended or adjusted under 35 U.S.C. 154(b) by 246 days.

(21) Appl. No.: 16/707,355

(22) Filed: Dec. 9, 2019

(65) Prior Publication Data

US 2020/0193589 A1 Jun. 18, 2020

Related U.S. Application Data

(60) Provisional application No. 62/777,748, filed on Dec. 10, 2018.

(51) Int. Cl.
*G06T 7/00* (2017.01)
*A01B 69/04* (2006.01)
(Continued)

(52) U.S. Cl.
CPC .......... *G06T 7/0004* (2013.01); *A01B 69/008* (2013.01); *B64C 39/02* (2013.01);
(Continued)

(58) Field of Classification Search
CPC ... A01B 79/005; A01B 69/001; A01B 69/008; A01B 79/02; G06K 2009/00644;
(Continued)

(56) References Cited

U.S. PATENT DOCUMENTS 5,467,271 A * 11/1995 Abel .................... A01B 79/005
702/5
5,764,819 A * 6/1998 Orr ........................ G06V 20/13
382/110
(Continued)

FOREIGN PATENT DOCUMENTS

CN 104134234 11/2014
CN 107148633 9/2017
(Continued)

OTHER PUBLICATIONS

Wiltz, Chris, "Edge TPU from Google Brings AL to Embedded Mobilke Devices", Electronics and Test, Sensors, Artifical Intelligence, dated Jul. 31, 2018, 10 pages.
(Continued)

*Primary Examiner* — Zhiyu Lu
(74) *Attorney, Agent, or Firm* — Michael VanEngelen

(57) ABSTRACT

A computer-implemented method for generating an improved map of field anomalies using digital images and machine learning models is disclosed. In an embodiment, a method comprises: obtaining a shapefile that defines boundaries of an agricultural plot and boundaries of the field containing the plot; obtaining a plurality of plot images within the field from one or more image capturing devices that are located within the boundaries of the field; calibrating and pre-processing the plurality of plot images to create a plot map of the agricultural plot at a plot level; based on the plot map of the agricultural plot, generating a plot grid; based on the plot grid and the plot map, generating a plurality of plot tiles; based on the plurality of plot tiles, generating, using a first machine learning model and a plurality of first image classifiers corresponding to one or more first anomalies, a set of classified plot images that depicts at least one anomaly; based on the set of classified plot images, generating a plot anomaly map for the agricul-
(Continued)

tural plot; transmitting the plot anomaly map to one or more controllers that control one or more agricultural machines or database systems to perform agricultural functions on the agricultural plot.

18 Claims, 16 Drawing Sheets

(51) Int. Cl.
    *B64C 39/02*     (2023.01)
    *G06N 3/045*     (2023.01)
    *G06N 3/08*     (2023.01)
    *G06V 10/82*     (2022.01)
    *G06V 10/94*     (2022.01)
    *G06V 20/10*     (2022.01)
    *A01G 25/16*     (2006.01)
    *B64U 101/30*     (2023.01)
    *G06V 10/44*     (2022.01)

(52) U.S. Cl.
    CPC ............... *G06N 3/045* (2023.01); *G06N 3/08* (2013.01); *G06V 10/82* (2022.01); *G06V 10/955* (2022.01); *G06V 20/188* (2022.01); *A01G 25/16* (2013.01); *B64U 2101/30* (2023.01); *G06T 2207/10024* (2013.01); *G06T 2207/10036* (2013.01); *G06T 2207/10048* (2013.01); *G06T 2207/20081* (2013.01); *G06T 2207/20084* (2013.01); *G06T 2207/30188* (2013.01); *G06V 10/454* (2022.01); *G06V 20/194* (2022.01)

(58) Field of Classification Search
    CPC ............ G06K 9/00657; G06K 9/0063; G06K 9/00986; G06K 9/4628; A01G 25/16; B64C 2201/123; B64C 2201/127; B64C 39/02; B64C 39/024; G06N 20/00; G06N 3/0454; G06N 3/08; G06Q 50/02; G06T 2207/10024; G06T 2207/10036; G06T 2207/10048; G06T 2207/20081; G06T 2207/20084; G06T 2207/30188; G06T 7/0004

See application file for complete search history.

(56) References Cited

U.S. PATENT DOCUMENTS

| | | | | |
|---|---|---|---|---|
| 6,212,824 | B1* | 4/2001 | Orr ..................... | A01M 7/0089 47/1.01 R |
| 6,366,681 | B1* | 4/2002 | Hutchins ................ | G06V 20/13 382/110 |
| 6,529,615 | B2* | 3/2003 | Hendrickson ......... | G01J 3/2823 382/110 |
| 9,734,400 | B2* | 8/2017 | Shriver ................ | G01N 33/025 |
| 9,983,774 | B2 | 5/2018 | Disdero et al. | |
| 10,248,663 | B1* | 4/2019 | Keisler ................ | G06N 3/0454 |
| 10,255,670 | B1* | 4/2019 | Wu ........................ | H04N 7/183 |
| 10,846,843 | B2* | 11/2020 | Gonzalez ......... | G06Q 10/06315 |
| 2001/0036295 | A1* | 11/2001 | Hendrickson ......... | G01J 3/2823 382/110 |
| 2015/0254800 | A1* | 9/2015 | Johnson ............... | G06V 20/188 382/141 |
| 2015/0278640 | A1 | 10/2015 | Johnson et al. | |
| 2015/0310633 | A1* | 10/2015 | Nelan .................. | G06T 7/0002 382/110 |
| 2016/0019458 | A1* | 1/2016 | Kaufhold ............ | G01S 13/9029 706/20 |
| 2016/0050840 | A1* | 2/2016 | Sauder ................. | G05D 1/0094 701/3 |
| 2016/0239709 | A1* | 8/2016 | Shriver ................ | G06V 20/188 |
| 2017/0039765 | A1* | 2/2017 | Zhou ...................... | G06T 7/521 |
| 2017/0177201 | A1 | 6/2017 | Disdero et al. | |
| 2017/0228118 | A1* | 8/2017 | Sugumaran ........ | G01N 33/0098 |
| 2018/0027725 | A1* | 2/2018 | Koutsorodi .......... | A01C 21/005 |
| 2018/0084708 | A1* | 3/2018 | Neitemeier ............ | G06V 20/10 |
| 2018/0108123 | A1* | 4/2018 | Baurer ................... | G06V 20/56 |
| 2018/0218214 | A1* | 8/2018 | Pestun .................... | G06T 17/05 |
| 2018/0260626 | A1* | 9/2018 | Pestun ................. | G08G 5/0069 |
| 2018/0330269 | A1 | 11/2018 | Harris | |
| 2018/0349520 | A1* | 12/2018 | Bhalla ................ | G06Q 10/0631 |
| 2019/0188847 | A1* | 6/2019 | Gonzalez ......... | G06Q 10/06315 |

FOREIGN PATENT DOCUMENTS

| | | |
|---|---|---|
| CN | 107622281 | 1/2018 |
| CN | 108932742 | 12/2018 |

OTHER PUBLICATIONS

International Searching Authority, "Search Report" in application No. PCT/US19/65270, dated Feb. 25, 2020, 27 pages.

Current Claims in application No. PCT/US19/65270, dated Feb. 25, 2020, 5 pages.

International Bureau, "International Preliminary Report on Patentability" in application No. PCT/US2019/065270, dated Jun. 24, 2021, 17 pages.

* cited by examiner

Fig. 6

| Layer (type) | Output Shape | Param # |
| --- | --- | --- |
| input_2 (InputLayer) | (None, 64, 64, 3) | 0 |
| block1_conv1 (Conv2D) | (None, 64, 64, 64) | 1792 |
| block1_conv2 (Conv2D) | (None, 64, 64, 64) | 36928 |
| block1_pool (MaxPooling2D) | (None, 32, 32, 64) | 0 |
| block2_conv1 (Conv2D) | (None, 32, 32, 128) | 73856 |
| block2_conv2 (Conv2D) | (None, 32, 32, 128) | 147584 |
| block2_pool (MaxPooling2D) | (None, 16, 16, 128) | 0 |
| block3_conv1 (Conv2D) | (None, 16, 16, 256) | 295168 |
| block3_conv2 (Conv2D) | (None, 16, 16, 256) | 590080 |
| block3_conv3 (Conv2D) | (None, 16, 16, 256) | 590080 |
| block3_conv4 (Conv2D) | (None, 16, 16, 256) | 590080 |

Total params: 24,762,378

Trainable params: 4,737,994

Non-trainable params: 20,024,384

FIG. 14 ible, based on the canopy color and plant height information
MAPPING FIELD ANOMALIES USING DIGITAL IMAGES AND MACHINE LEARNING MODELS

BENEFIT CLAIM

This application claims the benefit under 35 U.S.C. § 119 as a non-provisional of provisional application 62/777,748, filed on Dec. 10, 2018, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

One technical field of the present disclosure is computer-implemented analysis of digital images. Another technical field is computer-implemented interpretation and analysis of digital images of agricultural fields, typically images obtained from above the ground using satellites, unmanned aerial vehicles or other aircrafts.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One of endeavors in precision agriculture is to accurately measure the percentages of abnormal areas of agricultural fields. Growers are often eager to understand the extent and severity of lodging and weeds in their fields, as well as the yield impact of those anomalies. Recently, many imaging approaches, particularly UAV-based imaging methods, have been investigated to detect lodging and weeds in the fields. For instance, Chu et al. (2017) assessed corn lodging rates based on the canopy color and plant height information measured by UAV. Huang et al. (2018) applied high-resolution UAV imaging systems to assess weeds distributions within a field. However, there is no systematic approach that can accurately and simultaneously detect and classify lodging, bare soil and weeds in an automated manner.

Certain approaches for lodging or equipment damage and weed detection have used expensive sensors such as LiDAR and hyperspectral sensors, or sophisticated and time-consuming post-processing such as Surface from Motion (Digital Surface Model). The throughput of those approaches is often limited, and thus makes them difficult to scale to commercial operations or multiple fields.

Based on the foregoing, improved and efficient computer-implemented methods are needed for determining anomalies in agricultural fields based on digital images.

SUMMARY

The appended claims may serve as a summary of the disclosure.

BRIEF DESCRIPTION OF THE DRAWINGS

In the drawings:

FIG. 6 illustrates an example embodiment of a spreadsheet view for data entry.

FIG. 14 illustrates an example of a neural network configuration for generating a field anomalies map using machine learning models.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. General Overview
2. Example Agricultural Intelligence Computer System
    2.1. Structural Overview
    2.2. Application Program Overview
    2.3. Data Ingest to the Computer System
    2.4. Process Overview—Agronomic Model Training
    2.5. Implementation Example—Hardware Overview
3. Digital Image Processing Approach
    3.1. Digital Image Processing of Aerial Images
    3.2. Digital Image Processing of Ground Images
4. Example Processing of Aerial and UAV Images
5. Example Processing of Ground Images
6. Example Implementation of Ground Image Processing
    6.1. Example Edge Computing Implementation
    6.2. Example Edge-TPU Computing Implementation
7. Example Machine Learning Approach
8. Example Classifiers
9. Example Image Classification
10. Example Neural Network Configuration
11. Example Flow Chart for Aerial and UAV Image Processing
12. Example Flow Chart for Ground Image Processing
13. Benefits of Certain Embodiments 1. General Overview In an embodiment, a machine learning approach is provided for the detection and mapping of lodging, bare soil, and weed patches in a corn field from color (Red-Green-Blue) and near-infrared (NIR) imagery collected from aircraft such as unmanned aerial vehicle (UAV) platforms, and/or ground vehicle platforms. Ground vehicles may comprise harvesters, combines or other apparatus that operates in agricultural fields. Digital images used in embodiments may comprise multichannel data with red pixel, green pixel, blue pixel and MR pixel or other components.

2. Example Agricultural Intelligence Computer System 2.1 Structural Overview

Figure 1:
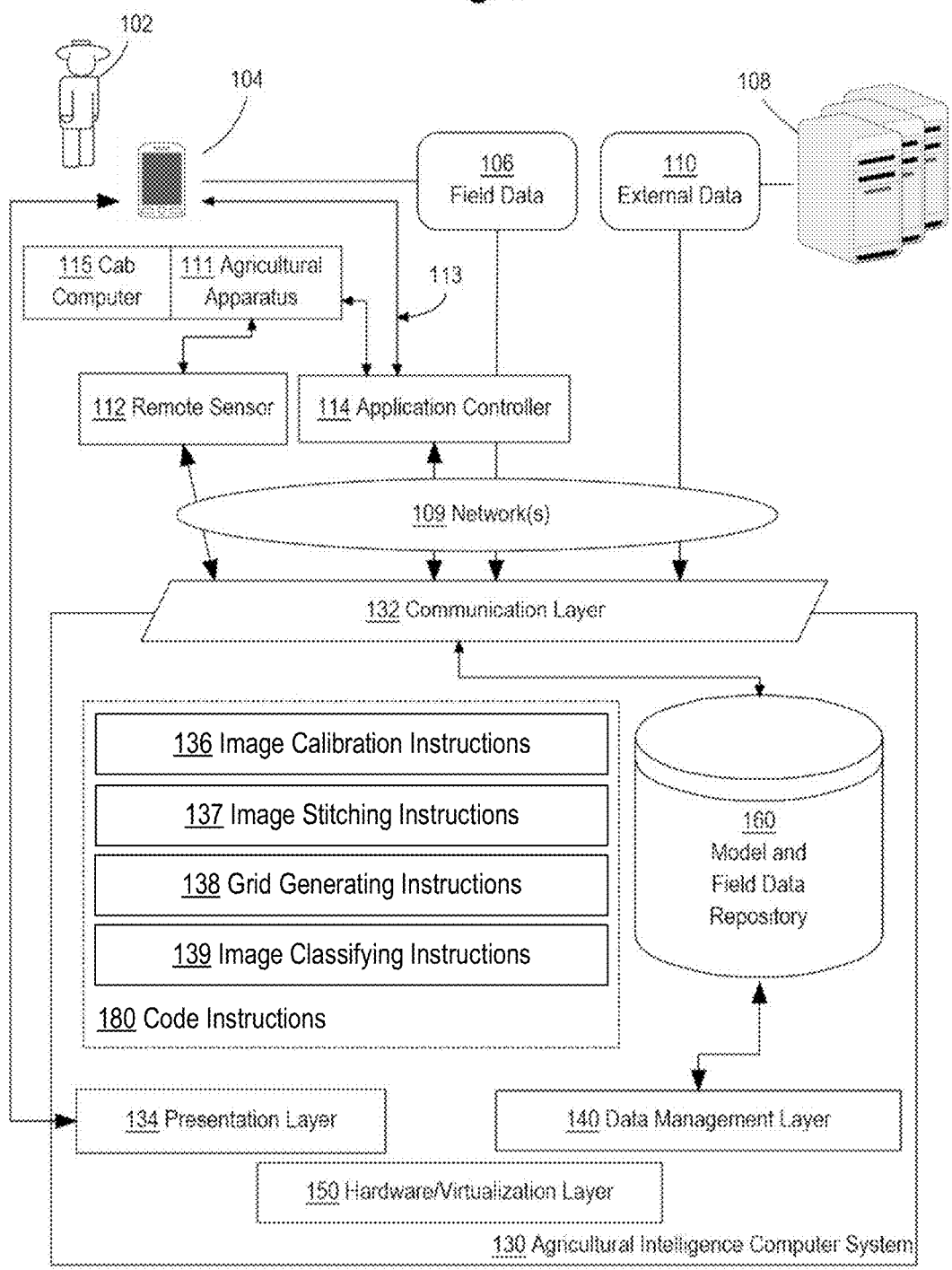
FIG. 1 illustrates an example computer system that is configured to perform the functions described herein, shown in a field environment with other apparatus with which the system may interoperate.

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, model and field data repository 160, and code instructions 180. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108 and remote sensor 112 for field data, external data, and sensor data respectively. Communication layer 132 may be programmed or configured to send the received data to model and field data repository 160 to be stored as field data 106.

Code instructions 180 may include a set of programming code instructions which, when executed by one or more computer processor, cause the processors to perform an approach for generating an improved map of field anomalies using digital images and machine learning models. In an embodiment, code instructions 180 comprise image calibration instructions 136, image stitching instructions 137, grid generating instructions 138 and image classifying instructions 139.

Image calibration instructions 136 may be configured to perform an image calibration of raw images such as aerial raw images, UAV raw images, ground raw images and the like. The image calibration may include enhancing or correcting an image color, brightness, saturation, and the like. It may also include a gamma-correction of the image and the pixel correction of the pixels in the image that appear to be incorrect or inconsistent.

Image stitching instructions 137 may be configured to stitch, or connect, a plurality of images into a large image. The stitching may include determining the edges of each image of the plurality of images, correcting the edges if needed to perform the accurate stitching, and concatenating the images into a coherent large image.

Grid generating instructions 138 may be configured to generate a grid template for an image, such as a stitched image. In an embodiment, the grid may include a plurality of rectangles ordered in rows and columns to traverse the entire image. In another embodiment, the grid may include a plurality of hexagons, or other shapes, that covers the entire image.

Image classifying instructions 139 may be configured to apply one or more image classifiers to an image. An image classifier may be an image, or a thumbnail image, that depicts a sample of, for example, an anomaly. Examples of anomalies include a bare soil anomaly, a lodging anomaly, a weed anomaly, a standing water anomaly, and the like.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shapefiles or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
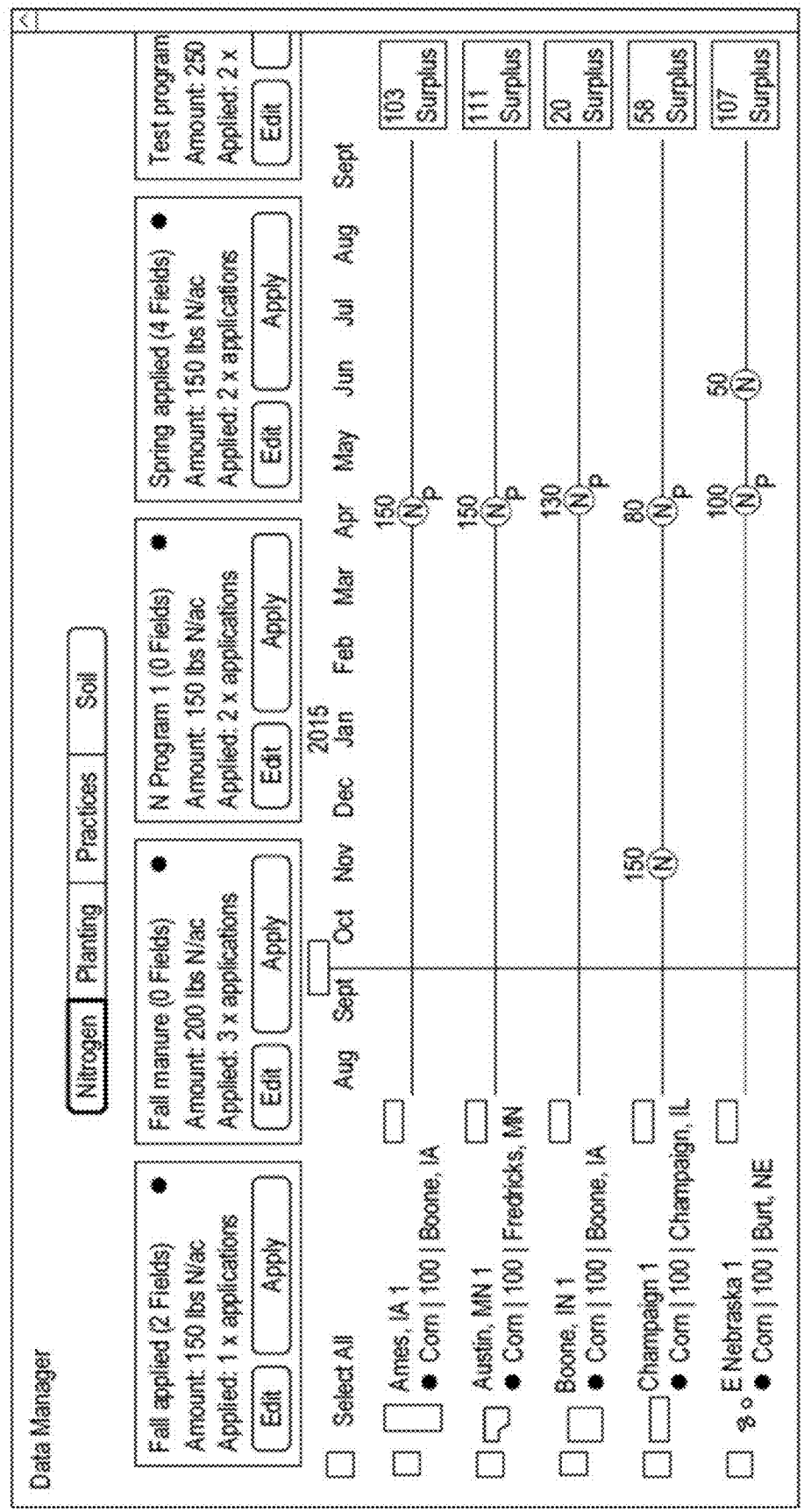
FIG. 5 illustrates an example embodiment of a timeline view for data entry.

FIG. 5 illustrates an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set-in operation. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs. N/ac in early April. The data manager may provide an interface for editing a program. In an embodiment, when a program is edited, each field that has selected the particular program is edited. For example, in FIG. 5, if the "Spring applied" program is edited to reduce the application of nitrogen to 130 lbs. N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

Figure 6:
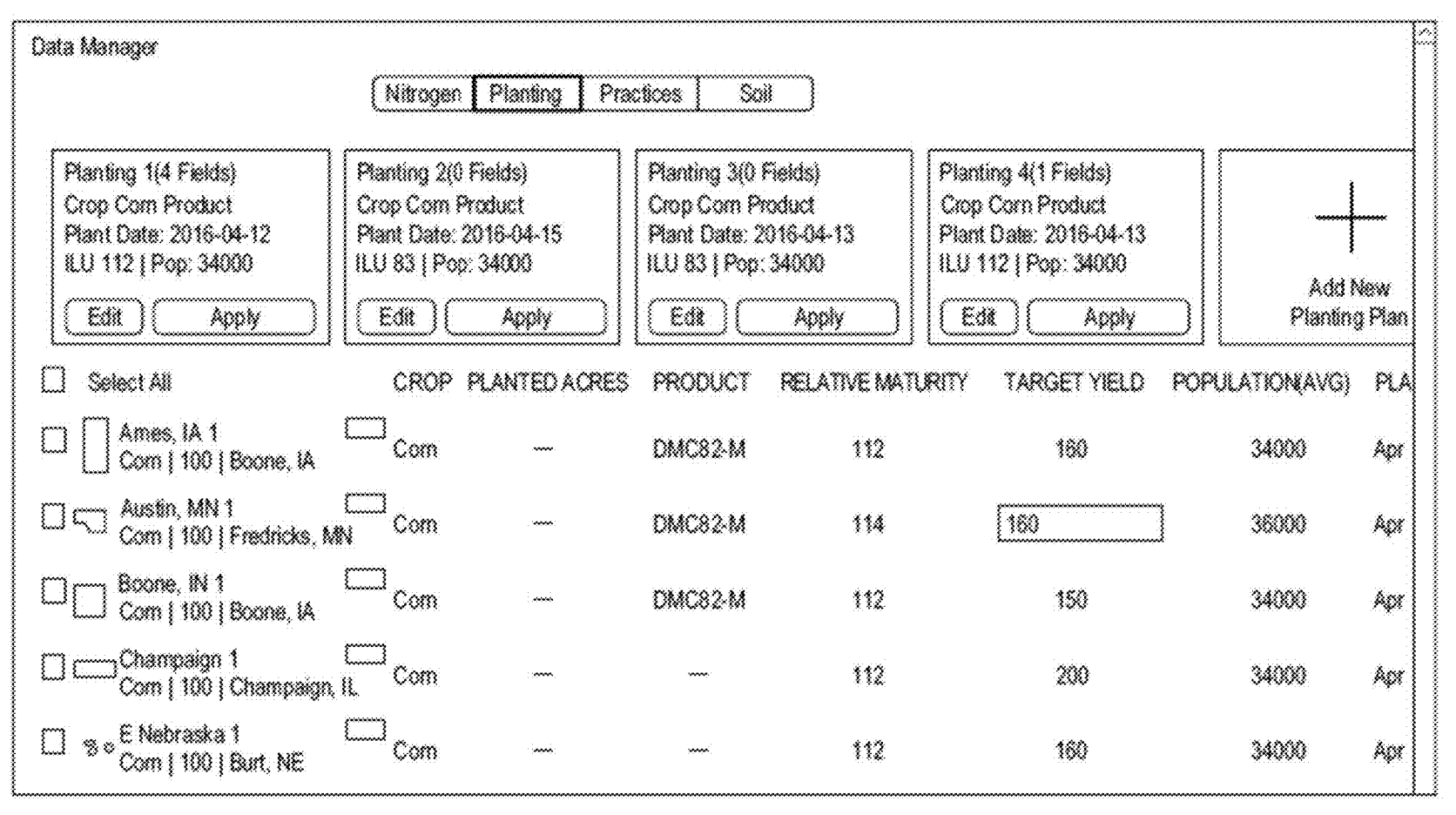

FIG. 6 illustrates an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 illustrates an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, digital image processing instructions 135 comprise a set of one or more pages of main memory, such as RAM, in the agricultural intelligence computer system 130 into which executable instructions have been loaded and which when executed cause the agricultural intelligence computer system to perform the functions or operations that are described herein with reference to those modules. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, digital image processing instructions 135 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
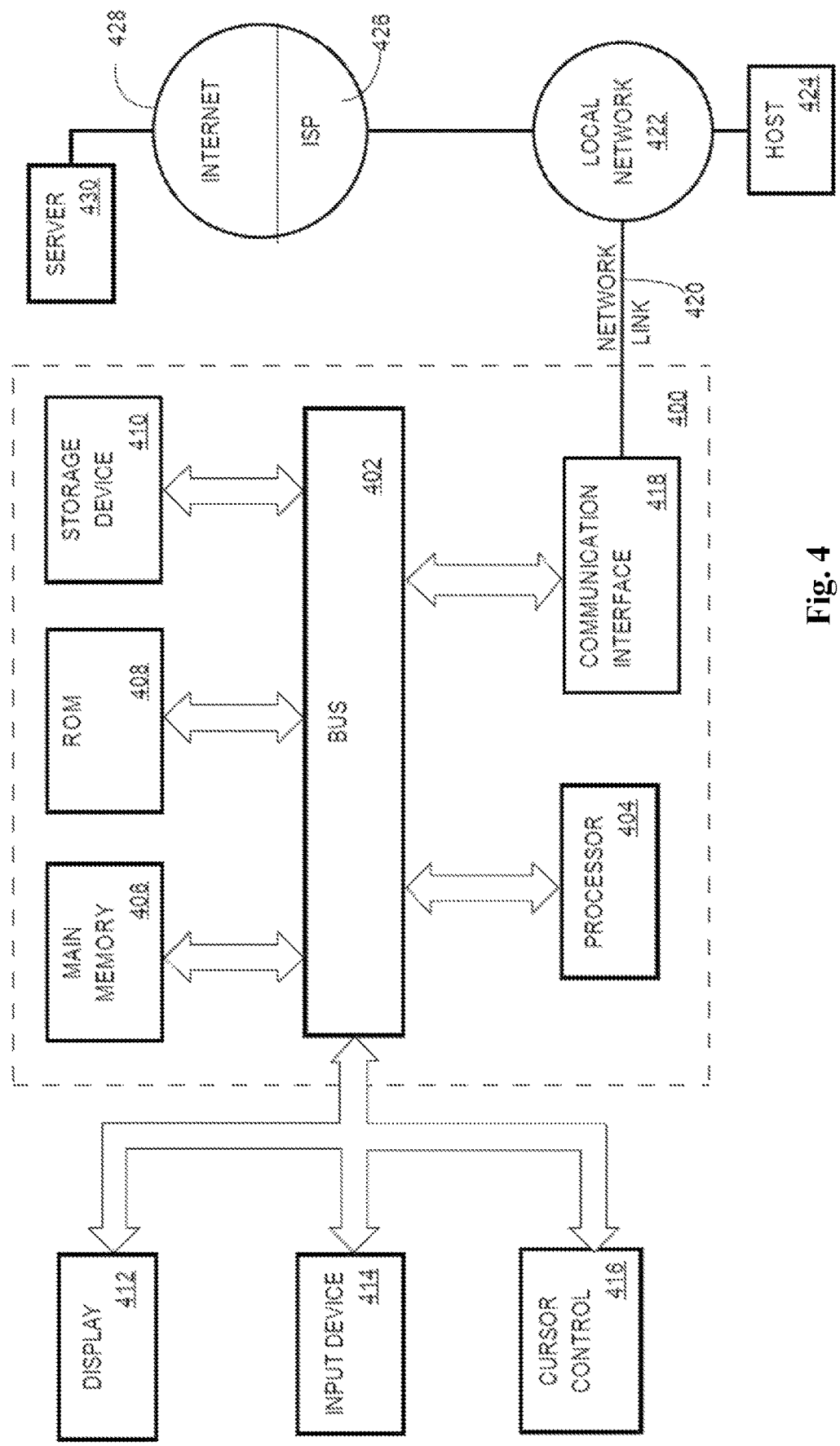
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more smartphones, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
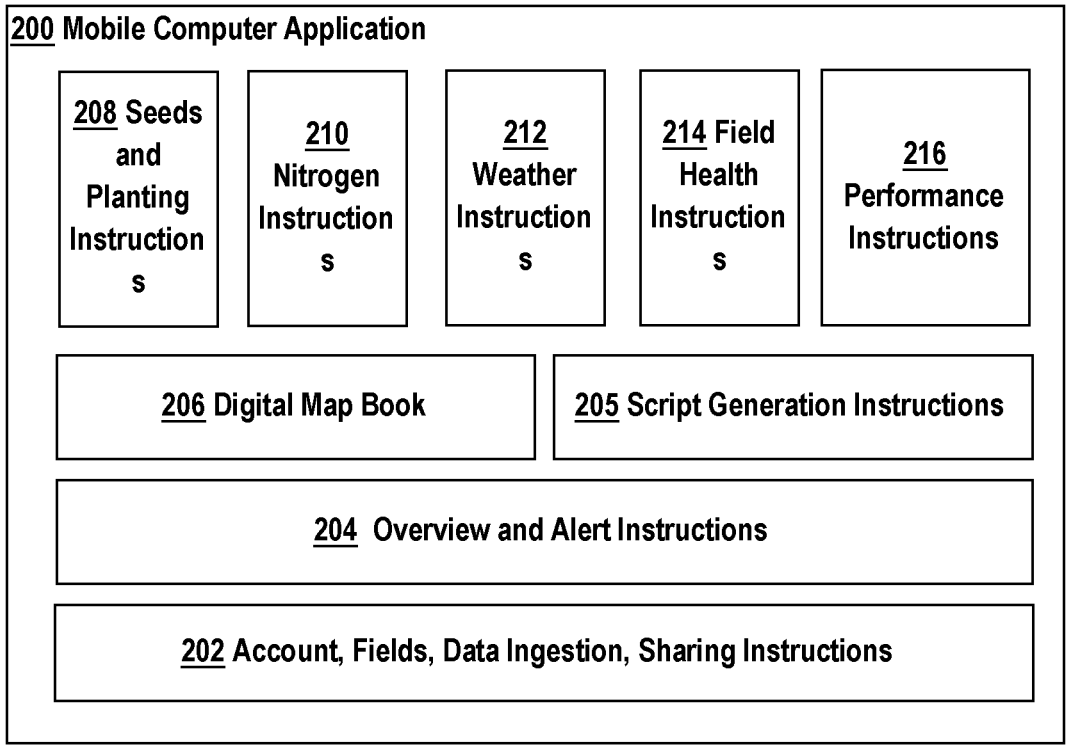
FIG. 2A and FIG. 2B illustrate two views of an example logical organization of sets of instructions in main memory when an example mobile application is loaded for execution.
Figure 2:
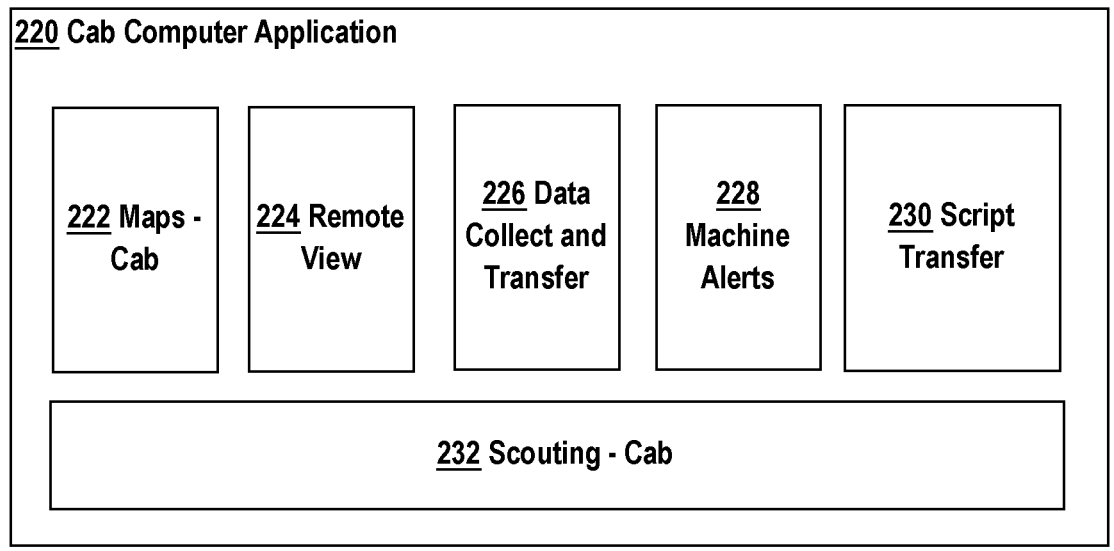

FIG. 2A and FIG. 2B illustrate two views of an example logical organization of sets of instructions in main memory when an example mobile application is loaded for execution. In FIG. 2A and FIG. 2B, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shapefiles, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, lodging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to FIG. 2B, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
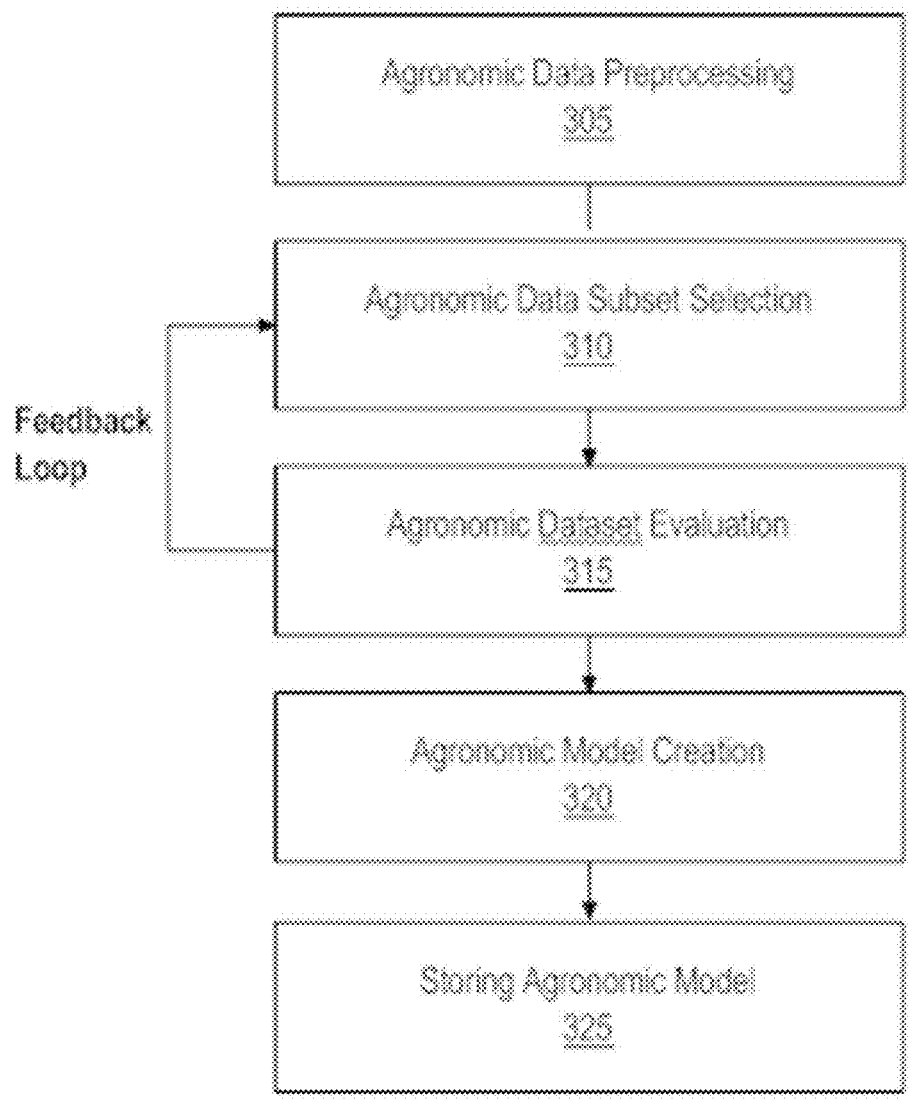
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated-services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Digital Image Processing Approach

Embodiments providing computer-implemented methods for digital image processing of images of agricultural fields, for stress detection, anomaly detection, and prediction or correction of yield data, are described. Embodiments are most useful in later stages of the growth season and later crop development when crop coverage and weed coverage may be perceivable in aerial images. The techniques herein can, however, be also used at any stage of a growth season.

In some embodiments, a large quantity of digital images of agricultural fields is obtained for training machine learning models, which then can be used to classify specific images captured from agricultural fields during the growth season. Image quality control and pre-processing may be implemented to generate ground truth data for use in training a machine learning model. Models based on fusion of classifier output and vegetative index data, such as NDVI or CCI data, may be used. As a result, a digital graphical or visual map of anomalies in the fields may be generated. The images may be correlated to actual yield data after harvest for further validation or calibration. The approaches herein may be integrated into a larger data processing workflow for cloud storage or publication of results and may be integrated with other models such as yield prediction models.

The proposed methodology is based on a combination of selected imaging hardware and innovative image processing algorithms implemented in computer programs. With this method, spatial and spectral image features are identified using high resolution images received from airborne platforms, unmanned aerial vehicle (UAV), and ground vehicle-mounted cameras. The images may include color images (such as RGB images) and/or multispectral images (such as near-infra-red images). High resolution, in this context, may mean less than 1 cm per pixel coverage. Machine learning models may execute on feature data to differentiate intact corn rows versus field anomalies described above, and yield classification output.

The classified images and image patches may be used to generate geographically rectified maps of intact and non-intact areas of agricultural fields. The maps may be color coded using the colors that correspond to different types of field anomalies. One map may depict one or more anomalies. A high-resolution anomaly map generated using these approaches can benefit placement trials, side-by-side field trials, crop protection trials, equipment issues detections, wind or ponding damage identification, yield data adjustment, as well as quantifying environmental impact at the sub-field level. The presented approach allows detecting and calculating all anomalies and their percentages within each tile/plot/grid generated for a field.

3.1. Digital Image Processing of Aerial Images

Figure 7:
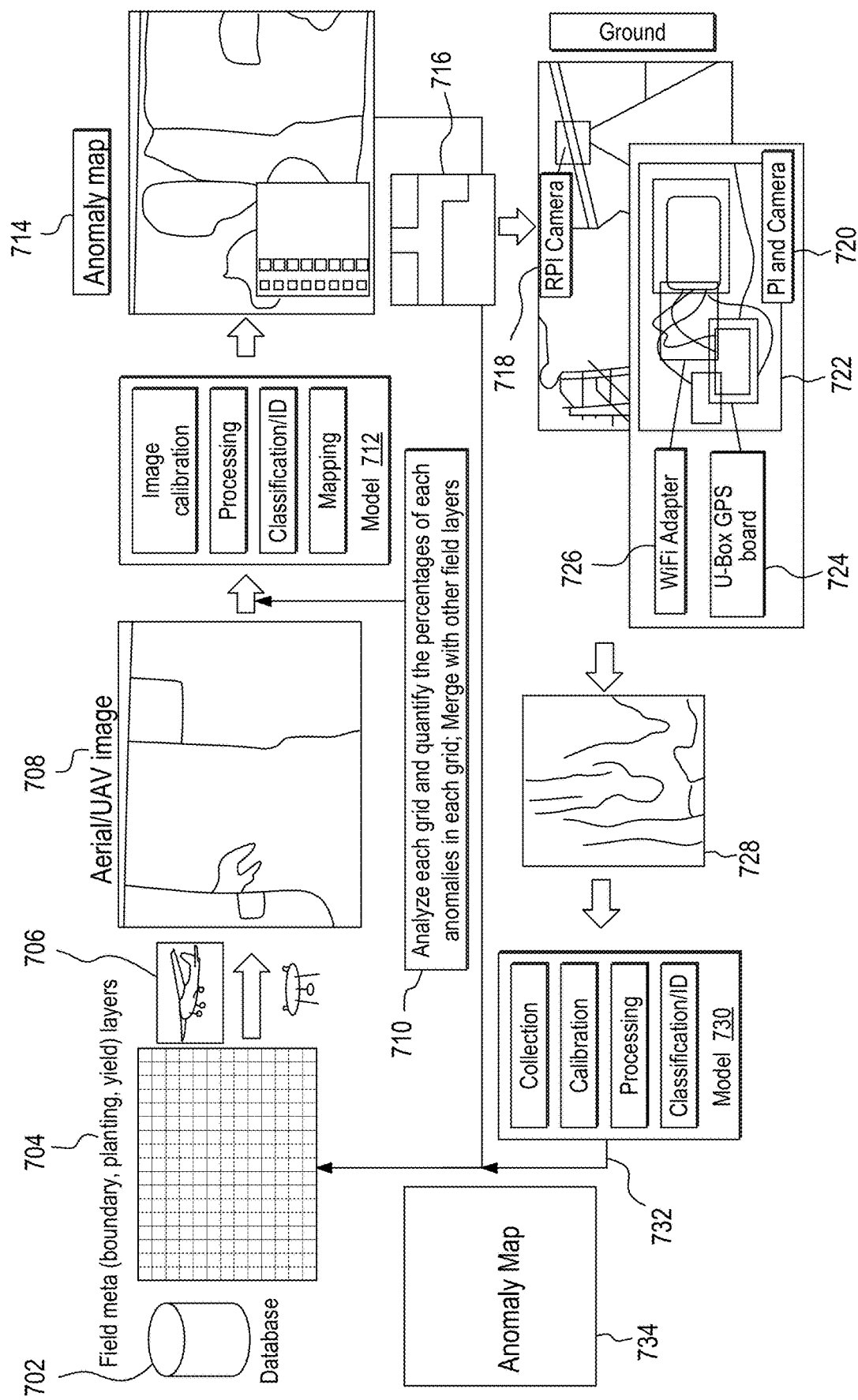
FIG. 7 illustrates an example processing of digital images to generate a field anomalies map using machine learning models.

FIG. 7 illustrates an example processing of digital images to generate a field anomalies map using machine learning models. In FIG. 7, field data information such as the boundary data, planting data, yield data, and so forth may be stored in a database 702. The database may be organized as a relational database or another type of database. The database may be arranged as a distributed database system or standalone server database system.

Field metadata describing the field boundaries, and all other information, depicted in FIG. 7 using an element 704, may be provided to aerial vehicles such as helicopters, agricultural aircrafts, control centers managing routes of the helicopters and aircrafts, and so forth. The information may be used to navigate the drones or any other unmanned aerial vehicles and direct them to collect aerial images from the field.

Upon receiving the field boundary information, an aerial vehicle 706 may start capturing various images as aerial vehicle 706 traverses the field. The aerial images may be also obtained from satellites or any other aerial vehicles.

Captured images 708 are referred herein as aerial/UAV images. These images may be provided as input to a machine learning model 712. Machine learning model 712 may perform the image calibration, the image processing, and the image classification. Machine learning model 712 may also generate a map that shows the field anomalies based on images 708.

Output from the model 712 may include one or more anomaly maps 714. The anomaly maps may include color-coded regions, where each color code expands to a different classification. Examples of classifications include areas that are, for example, covered by cornstalks, areas that are shown as a bare soil, areas that are covered by weeds, areas that are covered by roads, and so forth.

In an embodiment, based on map 714 a shapefile map 716 is generated. Shapefile 716 may include geographical coordinates of boundaries of one or more areas identified as having anomalies. Map 716 may be provided to ground systems.

3.2. Digital Image Processing of Ground Images

In an embodiment, ground systems may use map 716 to control on-ground cameras to collect ground images of a plot, or plots, identified using the boundaries included in map 716. The ground systems may use the collected ground images of the plot to generate an improved map of plot anomalies for the plot. The improved map of plot anomalies depicts the anomaly details at a higher level of detail than anomaly map 714 generated based on aerial images described above.

A ground system may include various cameras, such as a camera 718, various sensors, such as sensors/cameras 720, different image-capturing apparatuses 722, amplifiers 726, and other processing software/hardware tools configured to capture the images. The software and hardware tools are referred in FIG. 7 as an element 724.

The on-ground sensors and cameras may be used to collect ground images according to the shapefile boundaries provided in shapefile 716. The shapefile may include geographical coordinates that specify the boundaries of an agricultural plot. Therefore, a combine that has, for example, a camera installed on one of the combine's arms, may traverse an agricultural plot according to the coordinates provided in the shapefile, and as the combine traverses the plot, the combine can collect ground images from the plot.

In an embodiment, the ground images are calibrated, pre-processed and stitched to form a resulting image 728. Image 728 may include a depiction of the plot that is covered by corn, some weeds, some bare soil, and the like.

A set of images 728 may be ported as input to a model 730. Model 730 may be implemented as a machine learning model, and may perform different functions, such as a collection of all the images provided by the on-ground systems, calibration of the images. That may include, for example, adjustment of the boundaries, adjustment of the colors, hue, adjustment of the gamma components, and so forth. Model 730 may also process those images. That may include the stitching and other processing that will be described later.

Resulting images may be processed to determine the classification of individual regions of the image. The classification allows determining which areas or portions of the field are covered by cornstalks, which areas are covered by weeds, which areas are covered by soil, bare soil, and so forth. Output images, as will be described later, may include a set of anomalies map, and each map may depict an individual anomaly, such as bare soil, weeds, and so forth. The maps may be also provided to a database 702.

4. Example Processing of Aerial and UAV Images

Aerial survey is a method of collecting geomatics data using data collection instruments installed on airplanes, helicopters, UAVs, balloons and other mobile devices. Examples of geomatic data may include aerial images, Lidar data, images representing various visible and invisible bands of the electromagnetic spectrum, geophysical data, and the like. Aerial survey may also refer to an analysis of charts or maps of geographical regions. Aerial survey usually provides data that is at a higher resolution than, for example, data provided by the satellites.

The proposed approach consists of an image acquisition stage and a machine learning stage. In the image acquisition stage, in an embodiment, for a ground-based imaging platform, a custom computer system comprising a Raspberry Pi processor, camera and GPS receiver acquires geo-referenced RGB digital images automatically during harvest operations or other agricultural field operations. In this context, geo-referencing means that each digital image, at the time of capture and storage, is stored in association with geo-location metadata, i.e., a shapefile. The metadata may include latitude and longitude values obtained from a GPS receiver mounted on the apparatus with the camera and processor. Retrieving geo-location data and storing location metadata with images permits reconstructing a complete image of a field later and/or generating digital maps based on executing the machine learning stage using the collected images.

Additionally, or alternatively, for a UAV-based imaging platform, a high-resolution color camera (for example the Sony RX1R-II) or a multispectral camera is integrated with a commercial drone platform (for example the Microdrones MD4-1000 or DJI M600), which can be programmed to automatically survey a pre-defined area and collect high-resolution color and multispectral images.

The use of mobile discovery imaging platforms of these types enables the collection of data and images at every pass through the field. Subfield zones may be identified in completed images for high accuracy imaging and sensing. For example, subfield zone metadata may be added to images at the time that images are collected, if a zone map is available in computer memory at the time of image capture. GPS data obtained from a GPS receiver may be used to correlate zone maps to the then-current location of a UAV or harvester that is capturing images. Furthermore, the hardware arrangements proposed herein can reduce cost and development time for scaling up of imaging capabilities.

Figure 8:
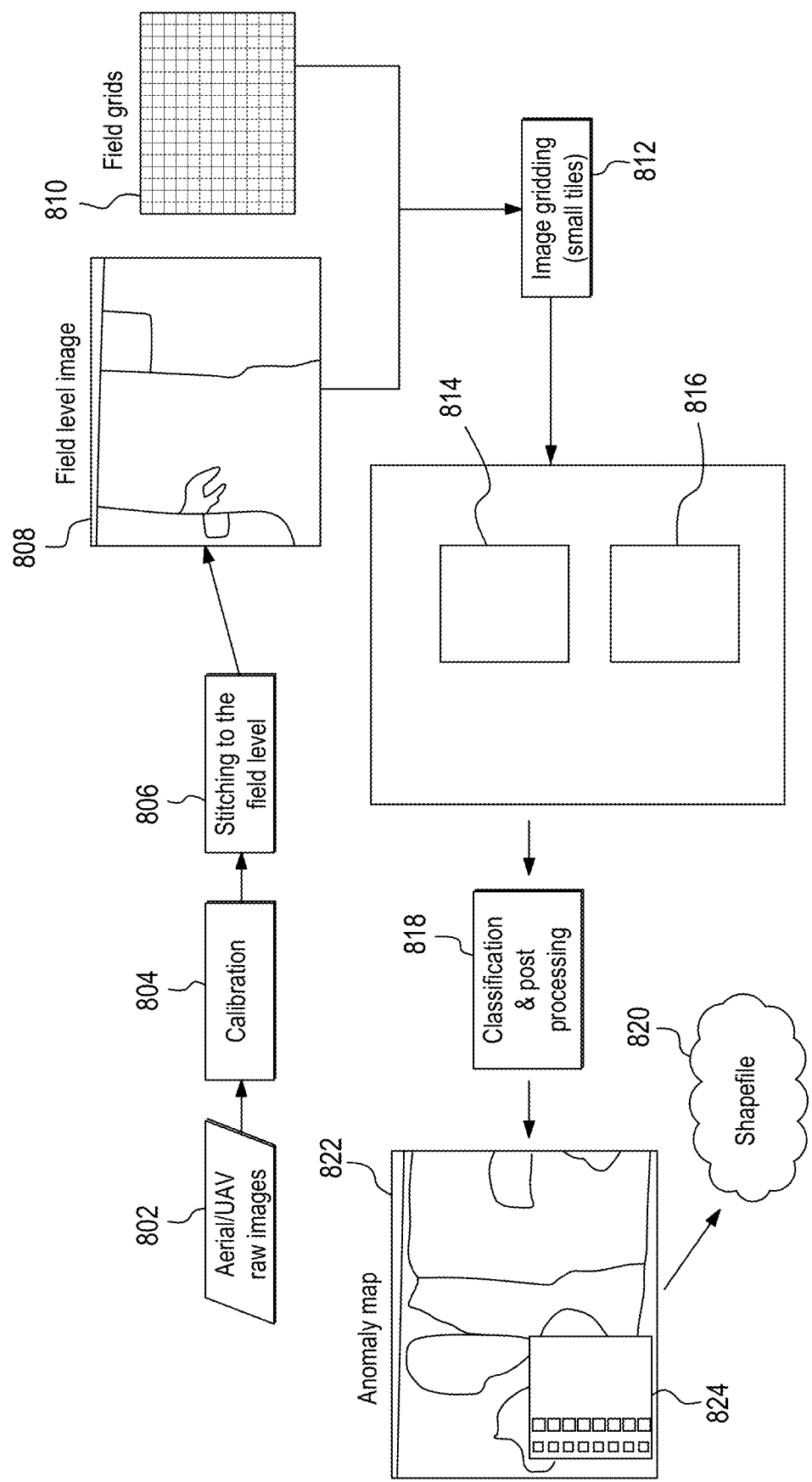
FIG. 8 illustrates an example processing of aerial and UAV images to generate a field anomalies map using machine learning models.

FIG. 8 illustrates an example processing of aerial and UAV images to generate a field anomalies map using machine learning models. FIG. 8 illustrates an example processing of aerial and UAV images to generate a field anomalies map using machine learning models. In FIG. 8, one or more aerial UAV images 802, are provided to a calibration unit, 804. That calibration may include a color correction, a hue correction, a resolution correction, a gamma color correction, and so forth. The calibrated and pre-processed images are provided to a stitcher 806 that performs the stitching of the calibrated images at a field level.

A field level map refers to an image that covers a typical US agricultural field having, for example, 40 to 100 acres. The field level map is usually defined by its borders. In sharp contrast, a plot level map refers to a small rectangular area inside the field, which may have, for example, a 2-crop-row width and a 20-feet long length.

Usually, several hundreds of raw images or processed images are stitched to a field level image which is usually a large orthomosaic image. An example of the orthomosaic image is an image 808.

In an embodiment, image 808 is provided to a grid generator that divides the orthomosaic image into a grid of small spatial grids. Each grid may have, for example, 64 by 64 pixels to cover 10 feet by 10 feet square area. These details are provided only for illustration purposes and should not be considered as limited in anyway. Actual spatial grids may be either larger or smaller. It depends on the implementation. Field grid 810, or a set of small spatial grids, becomes an image grid of small tiles 812.

In a next step, small tiles 812 are provided to a classification unit, and the images may include, for example, an image 814, an image 816, and so forth.

A classification and post-processing unit 818 may utilize a machine learning model, such as model 712 described in FIG. 7.

Output of model 818 may include one or more anomaly maps. The maps may include maps 822. Content of maps 822 may be shown according to a legend 824, which describes different colors assigned to different, classified regions. One region may correspond to, for example, cornstalks, while other images may show weeds, or bare soil, and so forth.

In an embodiment, based on the images, model 818, a so-called shapefile is generated. An example of the shapefile is a shapefile 820. Shapefile 820 may include, for example, geographic coordinates for different regions, for different grid or small tiles, that include the classified characteristic.

5. Example Processing of Ground Images

The techniques herein also can be used to realize time-lapse imaging of a field by repeatedly capturing images of the field at different, spaced-apart times using a camera-computer apparatus that is mounted in a fixed location in a field, such as on a pole. In one embodiment, an elongated pole is affixed in the ground in a field, and a solar cell array and computer chassis are affixed to the pole. The chassis is affixed in an elevated location so that a camera in the apparatus has a clear view of the field from an elevated height. The solar cell array is coupled to the computer chassis to serve as a power supply. The computer chassis comprises a Pi camera, Raspberry Pi 2B processor, solar panel controller and LTE modem. The processor may be programmed to signal the camera to capture an image hourly and to energize the LTE modem to upload the images to cloud data storage periodically.

Figure 9:
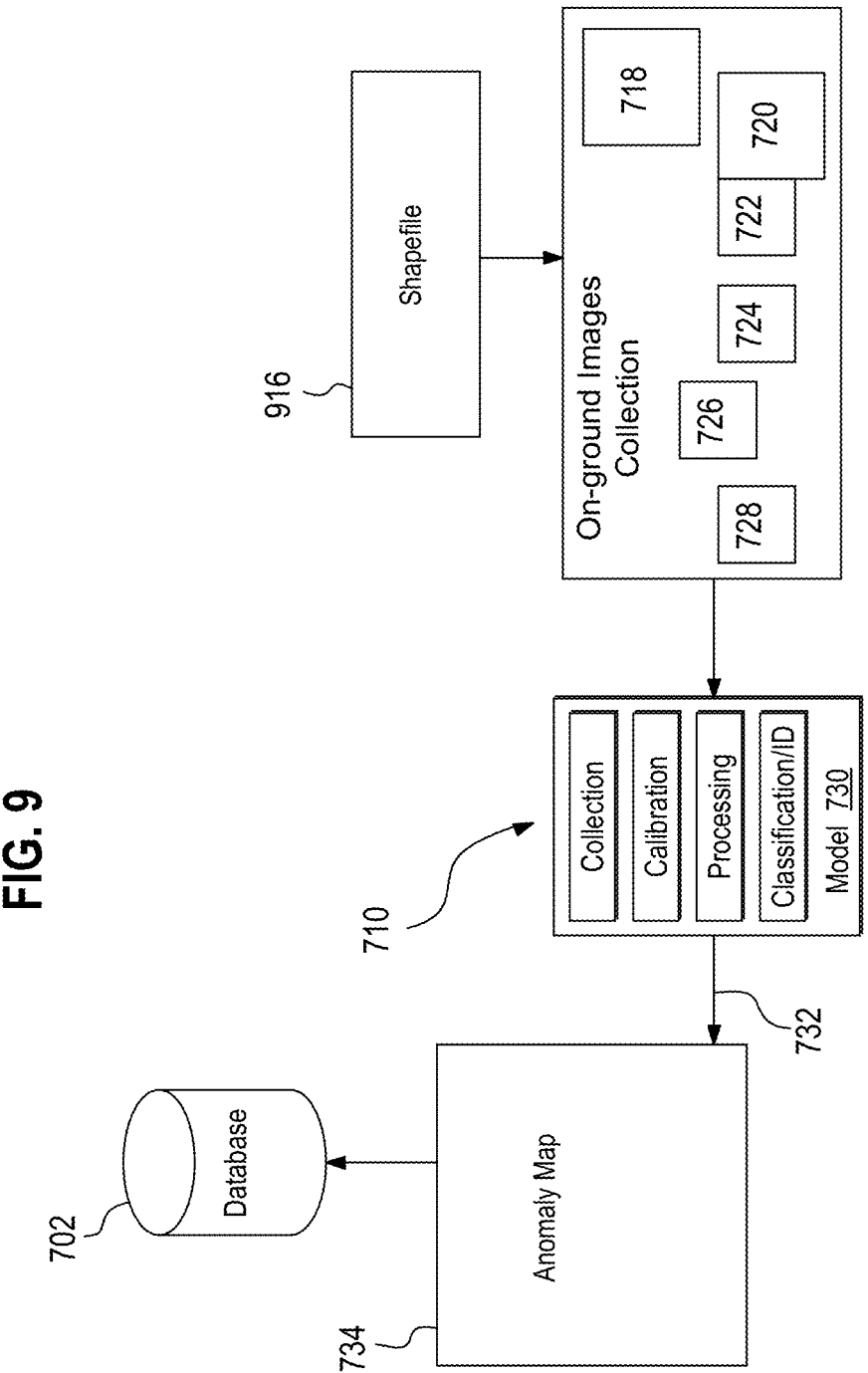
FIG. 9 illustrates an example processing of ground images to generate a field anomalies map using machine learning models.

FIG. 9 illustrates an example processing of ground images to generate a field anomalies map using machine learning models. FIG. 9 is a detailed example of the ground processing. It is assumed that a shapefile 916 is provided to on-ground vehicles, such as combines, harvesters, and tractors, that are equipped with cameras configured to collect images such as ground images of the field. The images may be more detailed than aerial/UAV images.

In an embodiment, ground images may be captured by cameras, such as a camera 718 that may be mounted on a combine, a tractor, a seeder, and the like. Other cameras may include cameras 720, 722, 724 that may be mounted on poles, fences, and the like.

In an embodiment, on-ground processing includes amplifying the ground images performed by, for example, an amplifier 728, or any other processing element 726.

Ground images may be provided to a model 730, which is configured to collect the images, calibrate the images, and process the images. The processing may include performing the image classification to determine whether the images depict any anomalies in the field.

Output 732 from model 730 may include one or more anomaly maps 734. The maps, as described before, may be organized as a set of maps, and each of the maps may indicate a separate or an individual anomaly. For example, one map may show weeds, another map may show bare soil, and so forth. The maps may be stored in database 702.

Alternatively, or in addition to, the maps may be used or transmitted to on-ground vehicles and on-ground agricultural machines to control the vehicles and machines to perform various agricultural operations. For example, if one of the anomaly maps indicates the areas of an agricultural field that are covered by bare soil, but should be planted with seeds instead, then the map may be sent to a seeder to instruct the seeder to plant the seeds in the areas.

6. Example Implementation of Ground Image Processing

In an embodiment, a computer-camera apparatus is affixed to an arm of a combine or harvester. The apparatus may comprise a Raspberry Pi processor, a Pi camera, a U-Blox GPS board and a Wi-Fi adapter. In this embodiment, the processor is programmed to signal the camera to capture an image when the then-current geographical location of the mobile combine or harvester, as determined by reading location data from the GPS board, matches a prescription for image capture. Prescriptions or programs for image capture may specify capturing images when the harvester is passing particular points in space or using a specified separation distance as the harvester traverses the field, or according to other schemes.

In an embodiment, using images captured from a combine in the foregoing manner, approximately 300 individual images were manually labeled; about 230 images were labeled to indicate normal plots with no damage, good crop stands and visible alleys and about 70 images were labeled to indicate gaps and lodging. A CNN transfer learning model was developed using Inception v.3 in TensorFlow and Domino. This model achieved 91% prediction accuracy with N=35. Examples of normal and abnormal plots are shown in the drawing figures and/or specification slides.

In an embodiment, crop images were captured using the combine-mounted camera based on GPS or distance trigger signals transmitted to the camera from the Raspberry Pi processor. Thumbnail images were produced and transmitted wirelessly with GeoTIFF format images to a gateway computer mounted to the combine. The gateway transmitted the image data to cloud storage using wireless transmission, and also was programmed to retrieve shapefiles from cloud storage and load them via a micro-USB connection to the Raspberry Pi processor. A Trimble GPS receiver provided geo-location data and generated a geo-location log that was uploaded to cloud storage. The geo-location data, in combination with the image data, were subjected to image stitching, to combine images captured at adjacent positions in the field as the combine moved, and post-processing to remove artifacts, adjust upright orientation and so forth. The resulting processed images were then used for model development, training, validation and classification as described herein.

In another embodiment, images were captured using a radio-controlled, ground traversing rover robot, or other unmanned ground vehicle, fitted with a Ublox GPS receiver and a Raspberry Pi 2B camera. This apparatus was capable of traversing a field and capturing images within the field primarily for identification of diseased plants or crop damage locations.

In another embodiment, an under-canopy disease imaging system was used consisting of a ZED stereo camera mounted to a short pole in a field and coupled to a NVidia TX1 computer having a weatherproof enclosure. The ZED is a color stereo camera capable of capturing 2K UHD images at 30 frames per second. The TX1 computer is Li battery powered and included a second camera. A CHC RTX GPS receiver was separately mounted on another pole and communicatively coupled to the computer. This apparatus was capable of capturing over 8,000 images of Goss wilt, gray leaf spot and common rust.

In still another embodiment, a Velodyne VLP-16 16-channel LiDAR apparatus was mounted on a mobile combine and was capable of imaging lodging in corn fields. Lodging values heavily affect crop yield, yet human visual ratings are labor-intensive to obtain and slow. Digital imaging can increase throughput and measure all trial plots during treatment experiments or comparisons, when equipped on combines. In one embodiment, this apparatus was programmed to image the four (4) corn rows on the left side of the combine. A Garmin GPS was communicatively coupled to the LiDAR which permitted wirelessly transmitting LiDAR image data to cloud-based servers.

6.1. Example Edge Computing Implementation

Edge computing often refers to the data computation and processing that occurs close to the sources of the data. In imaging applications, edge computing devices are typically deployed on the imaging collection platforms that are located in a close proximity to the cameras and sensors, and not on the centralized computing server in the cloud. The edge computing usually helps an imaging system to reduce unnecessary data traffic between the system and the central database or the cloud and provides real time image processing capabilities.

An "AI accelerator," or a "neural network accelerator," is an application-specific integrated circuit (ASIC) designed to support artificial neural networks, machine vision systems, and machine learning systems. Examples of the vendors that have developed their own AI accelerators include the Intel based Nervana Neural Network Processor (NNP), the Google based Tensor processing unit (TPU), and the Nvidia based Graphics processing unit (GPU). Edge TPU, for example, is the solution developed by Google and is used to combine the advantages of both edge computing and AI accelerator. In other words, the Edge TPU is a low-power and size-modest solution that can be deployed on an imaging device that is powered by, for example, a battery or a generator. The Edge TPU can help the imaging system to enhance the AI computation capabilities and provide a platform for executing a machine learning/AI model in a pseudo-real-time.

In an embodiment, an approach for mapping field anomalies using digital images and machine learning models is implemented using the edge computing technologies. Examples of the edge computing technologies have been described above. One of such technologies includes the Edge TPU technology. However, the presented approach is not limited to the Edge TPU implementation. In fact, other approaches may be implemented as well.

Figure 10:
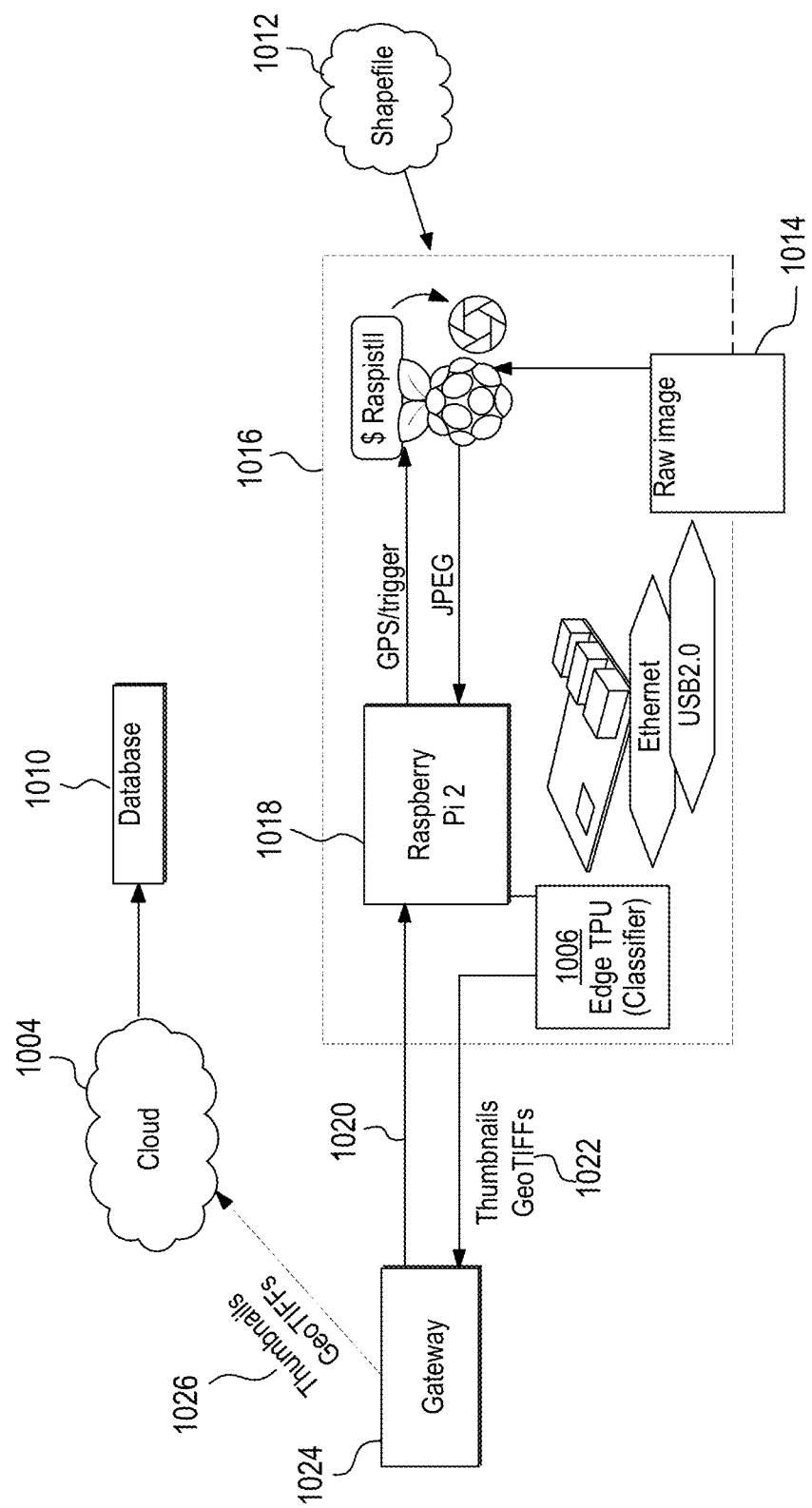
FIG. 10 illustrates an example processing of ground images to generate a field anomalies map using machine learning models and an edge TPU.

FIG. 10 illustrates an example processing of ground images to generate a field anomalies map using machine learning models and an Edge TPU. FIG. 10 illustrates a particular implementation of the process shown in FIG. 9. A shapefile 1012 is provided to on-ground systems, and the on-ground systems use shapefile 1012 to determine the boundaries of the fields and to control on-ground cameras to collect on-ground images from the field. Subsequently, the collected on-ground images are processed using, for example, an Edge TPU hardware unit 1006 that is in communications with a communications gateway 1024.

In an embodiment, an on-ground system 1016 may use a Raspberry Pi 2 processor 1018 and a GPS trigger that is generated based on shapefile 1012. The trigger is sent to cameras installed on the on-ground vehicles to instruct the cameras to take raw images 1014 of certain areas of the field.

Images 1014 captured by the cameras installed on on-ground machinery or vehicles may be sent as JPEG images to Edge TPU 1006 for processing. Edge TPU 1006 may apply one or more classifiers to the images to perform the image classification. The images may be sent via the Ethernet or provided via a USB 2.0 devices as, for example, thumbnails TIFF images 1022, to gateway 1024. Images 1022 may be also sent (1020) from gateway 1024 to processor 1018 for additional processing.

Gateway 1024 may be implemented as a server or a computer processor and may send the classified images as thumbnails 1026 in, for example, the TIFF format to a cloud system 1004. The TIFF images stored in cloud system 1004 may be also stored in database 1010.

7. Example Machine Learning Approach

In the machine learning stage, in an embodiment, programmed deep (transfer) learning models based on the ImageNet pretrained convolutional neural networks model (Inception v3) are programmed to classify digital images in multiple categories. The first category, in one embodiment, is intact rows of crop, such as corn or the like. The second category is non-intact corn rows occurring due to lodging, weeds, and/or bare soil. The output of the model is used to generate a map of the imaged areas of the field where each image is classified as intact corn, lodging, weeds, and bare soil. While lodging or crop damage, weeds and bare soil are identified herein for purposes of providing a clear example, other embodiments may operate to classify images for other anomalies, such as burning, animal damage, heat damage and so forth, based upon one or more training datasets that have been selected and used to train the CNN to address those anomalies.

Figure 11:
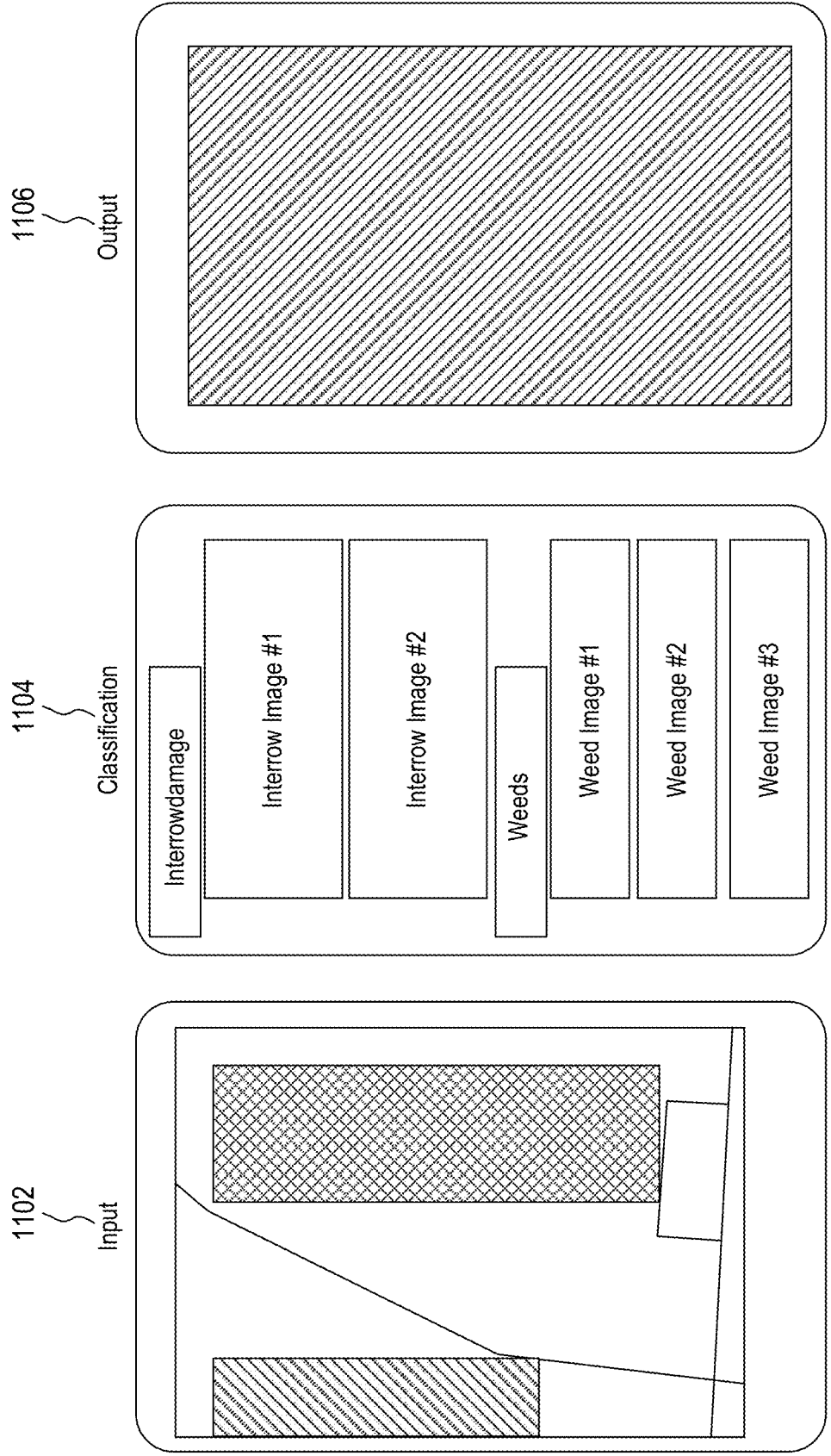
FIG. 11 illustrates an example machine learning approach for classifying images to generate a field anomalies map using machine learning models.

FIG. 11 illustrates an example machine learning approach for classifying images to generate a field anomalies map using machine learning models. In FIG. 11, input images, such as an image 1102, are provided to a machine learning model 1104 that, among other things, performs the image classification. The classification may include using a variety of classifiers.

In an embodiment, classifiers may include a plurality of various image samples that depict known anomalies. Examples of anomalies may include inter-row damage, weeds, standing water, and the like. For each type of anomalies, one or more classifiers may be provided. In FIG. 11 the classifiers depict the inter-row damage, and include an inter-row image #1, an inter-row image #2, and the like. The images for the same anomaly may include different images of the same anomaly, and each image may show, for example, a different view of the anomaly, a different subtype of the anomaly, a different color scheme used to depict the anomaly and the like.

The classification process may use images that allow to determine whether an on-ground image illustrates the anomaly, such as weeds, trees, and the like. To perform the image classification, the classification process may use various classifier images, such as the inter-row damage image #1, the inter-row damage image #2, a weed image #1, a weed image #2, a weed image #2, and like. All the images may be different.

Hence, when input image 1102 is subjected to the classification process 1104, the classifiers are applied to the grid tiles of input image 1102 to determine whether image 1102 matches any of the classifiers. The decision is referred to as an output 1106, and may include the detailed information as to whether image 1102 matches any of the classifiers, and if so, whether the matched classifier is the inter-row damage image #1, the inter-row damage image #2, the weed image #1, the weed image #2, the weed image #2, and like.

8. Example Classifiers

In one embodiment, an inventory of 5,000 to 6,000 images was obtained and classified to train a machine learning model. Classification labels may include CORN, INTERRROW DAMAGE, ROAD, SOIL, SOY, TREES, WATER, WEEDS, SHADOW, BUILDING, but other labels could be also used in other embodiments based on the content of the inventory of images.

In an embodiment, digital images captured from aerial equipment are programmatically provided to a calibration stage in which, for example, image artifacts may be removed, pixel sizes normalized, and other pre-processing performed. Next, the images may be divided into level 1 grids consisting of, for example, tiles of 640×640 pixels each. Each tile may be a multi-pixel array of a portion of a source image. In an embodiment, next, a plurality of times is selected for training or validation. Level 2 gridding may be applied using tiles of 64×64 pixels each. Other embodiments may use gridding with different pixel dimensions.

In an embodiment, the level 2 gridded tiles are subjected to manual labeling for soil, weeds, interrow gaps and other features. These labeled tiles then train a convolutional neural network for classification or are otherwise used for model development and implementation.

Thereafter, the trained model may be used to execute classification on other raw digital image files obtained from aerial equipment or other equipment, alone or in combination with vegetative index data such as NDVI data. When a combination is used, the vegetative index data for a particular field is fused or blended with classification output for digital images of the same field and is programmatically processed to generate an anomaly map of the field.

Figure 12:
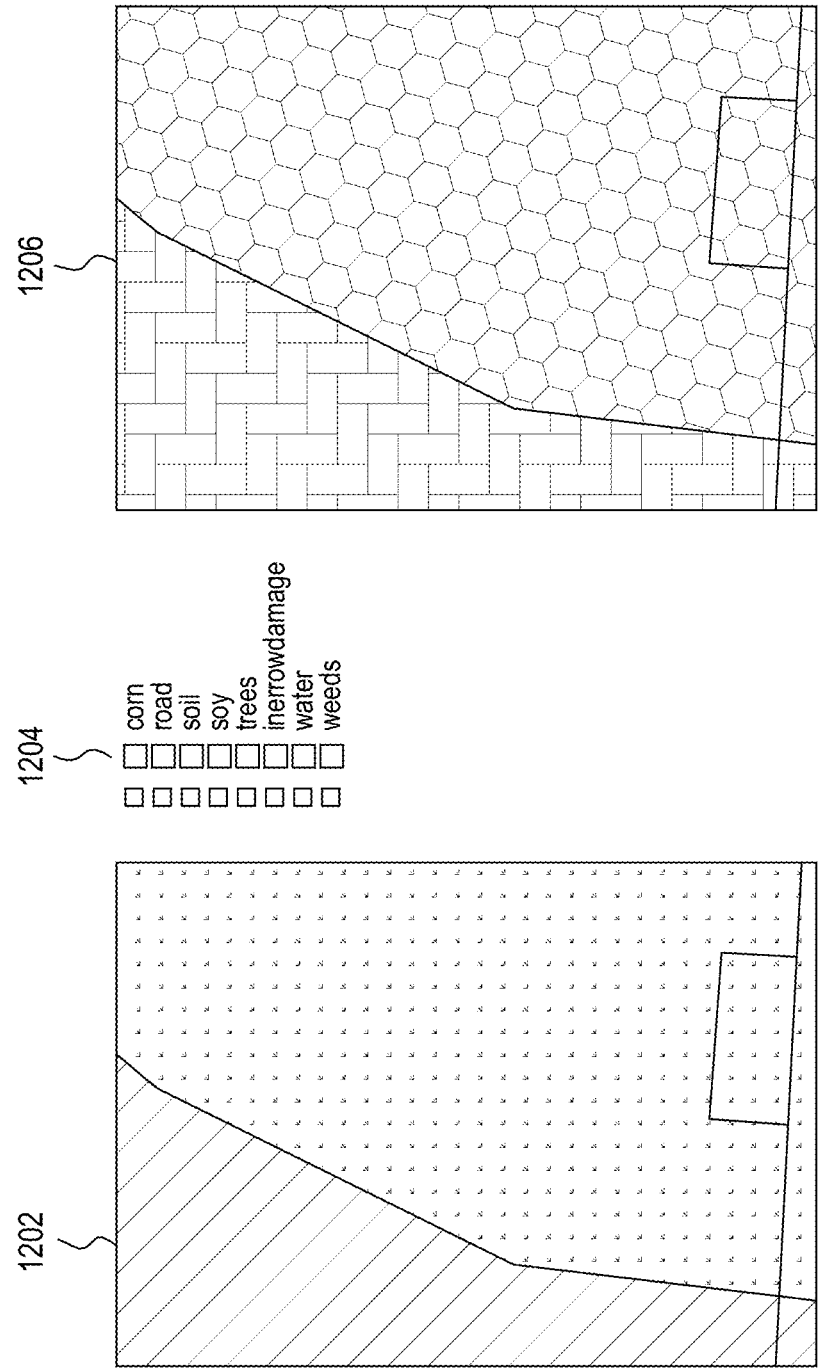
FIG. 12 illustrates an example image classification using a machine learning approach to generate a field anomalies map using machine learning models.

FIG. 12 illustrates an example image classification to generate a field anomalies map using machine learning models. In this example, an input image 1202 includes a grid of tiles, and each of them represents either corn, or soil, or weeds, or so forth. Image 1202 is processed by applying a set of classifiers 1204 to the image to determine an output image 1206. Image 1206 may include tile classification, and each tile may have an associated a classifier identifier indicating whether the tile corresponds to the crop or to a particular anomaly. Hence, image 1206 may be classified as, for example, corn, a road, soil, weeds, trees, water, or the like. The different types of anomalies are shown as element 1204.

9. Example Image Classification

Figure 13:
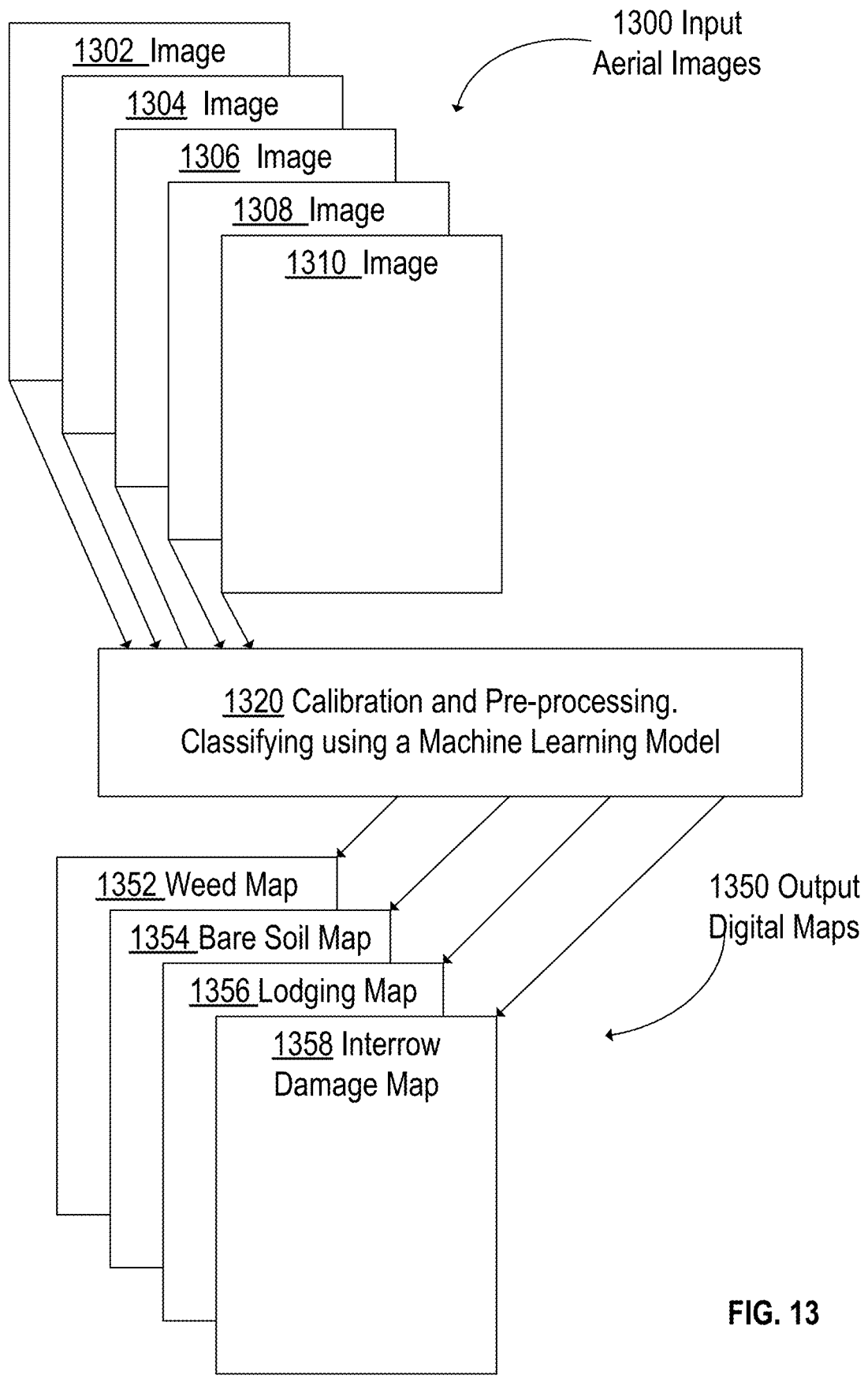
FIG. 13 illustrates an example of image classification using a machine learning approach to generate a field anomalies map using machine learning models.

FIG. 13 illustrates an example of image classification using a machine learning approach to generate a field anomalies map using machine learning models. In the depicted example, different input images 1300 are ported into a calibration and pre-processing processor, and then the pre-processed and calibrated images are subjected, in step 1320, to a classification process using a machine learning model.

For example, images 1302 through 1310 may be provided to a calibration and pre-processing system 1320, and once the images are calibrated and pre-processed, the images are classified using the approach described in previous figures.

The machine learning model may generate output 1350 that includes the classified image. In FIG. 13, the classified digital images include a weeds map 1352, a bare soil map 1354, a lodging map 1356, and the inter-row damage map 1358. Other maps of anomalies may also be generated. The different types of anomalies depend on specific characteristics of the field.

10. Example Neural Network Configuration

FIG. 14 illustrates an example of a neural network configuration for generating a field anomalies map using machine learning models. In the depicted example, a pseudo-machine code 1402 defines an organization of layers, input variables, blocks, and so forth, of the model. The provided example is used only for the illustration purposes, and the actual content of the neural network configuration depends on the specific implementation and the field characteristics.

In the depicted example, code 1402 is organized in such a way that a header 1404 includes a description of the layer, the type of the layer, output shape, and parameter numbers. For example, one of the layers may be an input layer 1406 that includes different shape parameters as 64 by 64 and three, and number of parameters here is zero.

Another element of the neural network configuration may include a block 1408, and other element may include a block 1410. Depending on the implementation, the neural network configurations may be different for different models and different implementations.

Usually, the network configuration includes a summary, such as a summary 1420 that shows the total count of the parameters. The configuration may also include a trainable parameter count 1422, and a non-trainable parameter counts 1424.

11. Example Flow Chart for Aerial and UAV Image Processing

Figure 15:
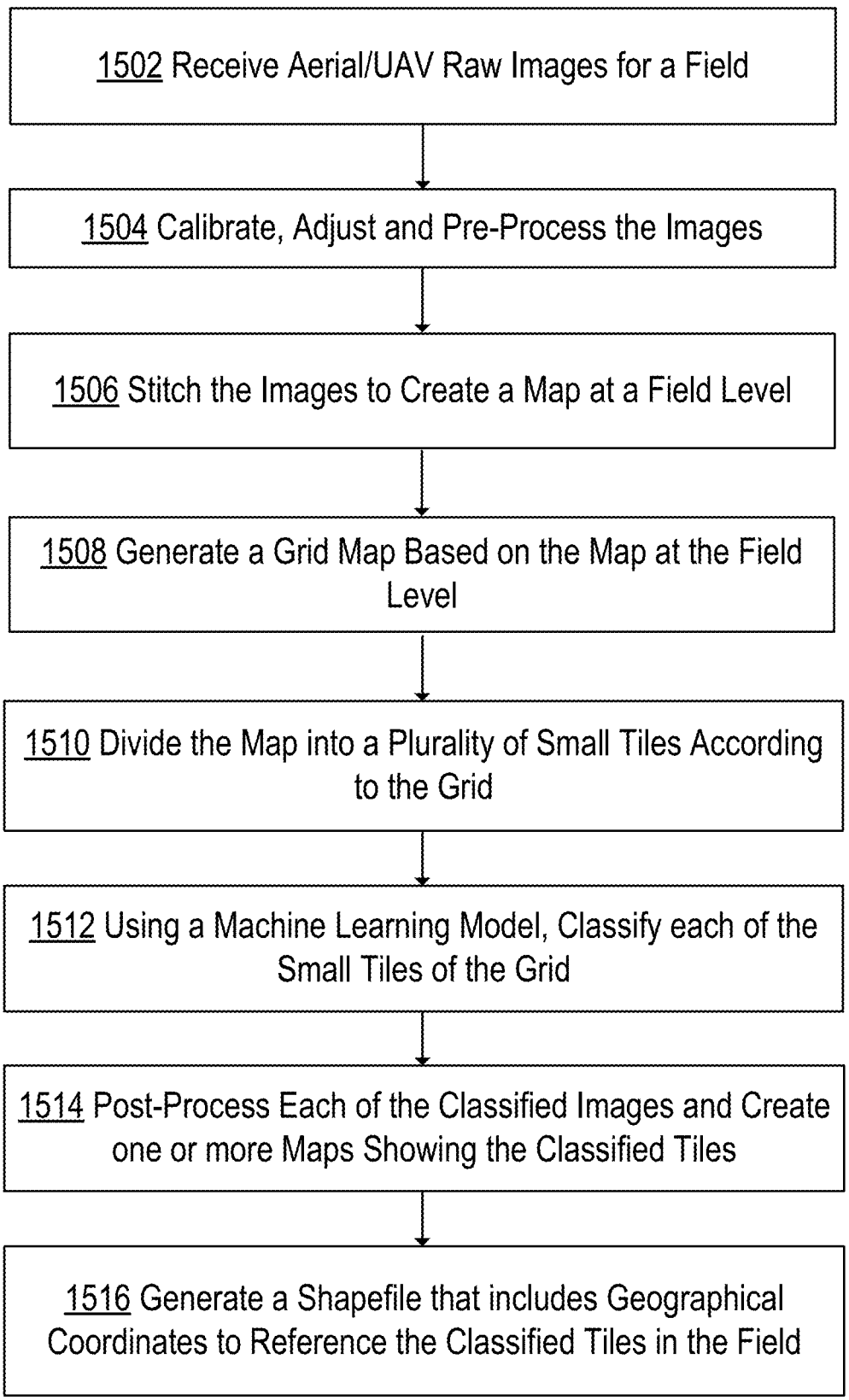
FIG. 15 illustrates an example flow chart for processing aerial and UAV images to generate a field anomalies map using machine learning models.

FIG. 15 illustrates an example flow chart for processing aerial and UAV images to generate a field anomalies map using machine learning models. The steps described in FIG. 15 may be performed by a distributed computing system implemented in a cloud, or on a server, or any other processing system configured to collect, process, and classify images.

In step 1502, a processor receives aerial/UAV raw images for a field. The images may be provided by satellites, helicopters, drones, or any other aerial vehicles configured to collect images.

In step 1504, the processor calibrates, adjusts, and/or pre-processes the images. As described before, this may include adjusting the colors on the images, adjusting the color saturation, adjusting the resolution, the formats of the images, performing a gamma calibration, and any other type of processing needed to improve the quality of the raw images.

In step 1506, the calibrated, adjusted, and pre-processed images are stitched to create a map at the field level. The stitching usually includes performing the stitching operation on hundreds and hundreds of images to generate a large orthomosaic image. That image may be substantial in size, as they may cover a large ground area.

In step 1508, based on the map at the field level, the processor generates a grid map. Generating a grid usually involves dividing the large orthomosaic image into a grid of small spatial grids that, for example, can be 64 by 64 pixels, and that are, for example, covering 10 by 10 feet regions of the field. These numbers may vary and may depend on the implementation.

In step 1510, the grid is divided into a plurality of small tiles, and each of the tile, as mentions before, may cover, for example, 10 by 10 feet area. In step 1512, using a machine learning model, each of the small tiles of the grid is classified to determine whether the tile illustrates area of the field that is covered with some anomalies, such as weeds, water, bare soil, or so forth. The classification process may be performed based on the classifiers described above.

In step 1514, each of the classified images is post-processed, and that may include, determining the probability that the classification was correct and creating one or more maps showing the classified tiles. For example, as shown in previous figures, the classified images may be used to generate a map that shows the location of the weeds in the field. The classified images may be also used to generate another map, and that map may show areas that are just covered with bare soil. Yet another map may be generated to show just the areas that are covered by trees.

In step 1516, based on the output generated by the machine learning model, a processor generates a shapefile. The shapefile includes geographical coordinates (latitude and longitude values) to reference the classified tiles or classified regions in the field. For example, if a weeds map is determined based on the classified images, then such a map illustrates area that are covered by weeds. Based on that map, a shapefile can be generated. The shapefile may provide or include geographical coordinates that create a boundary or boundaries of the areas that are covered by weeds.

12. Example Flow Chart for Ground Image Processing

Figure 16:
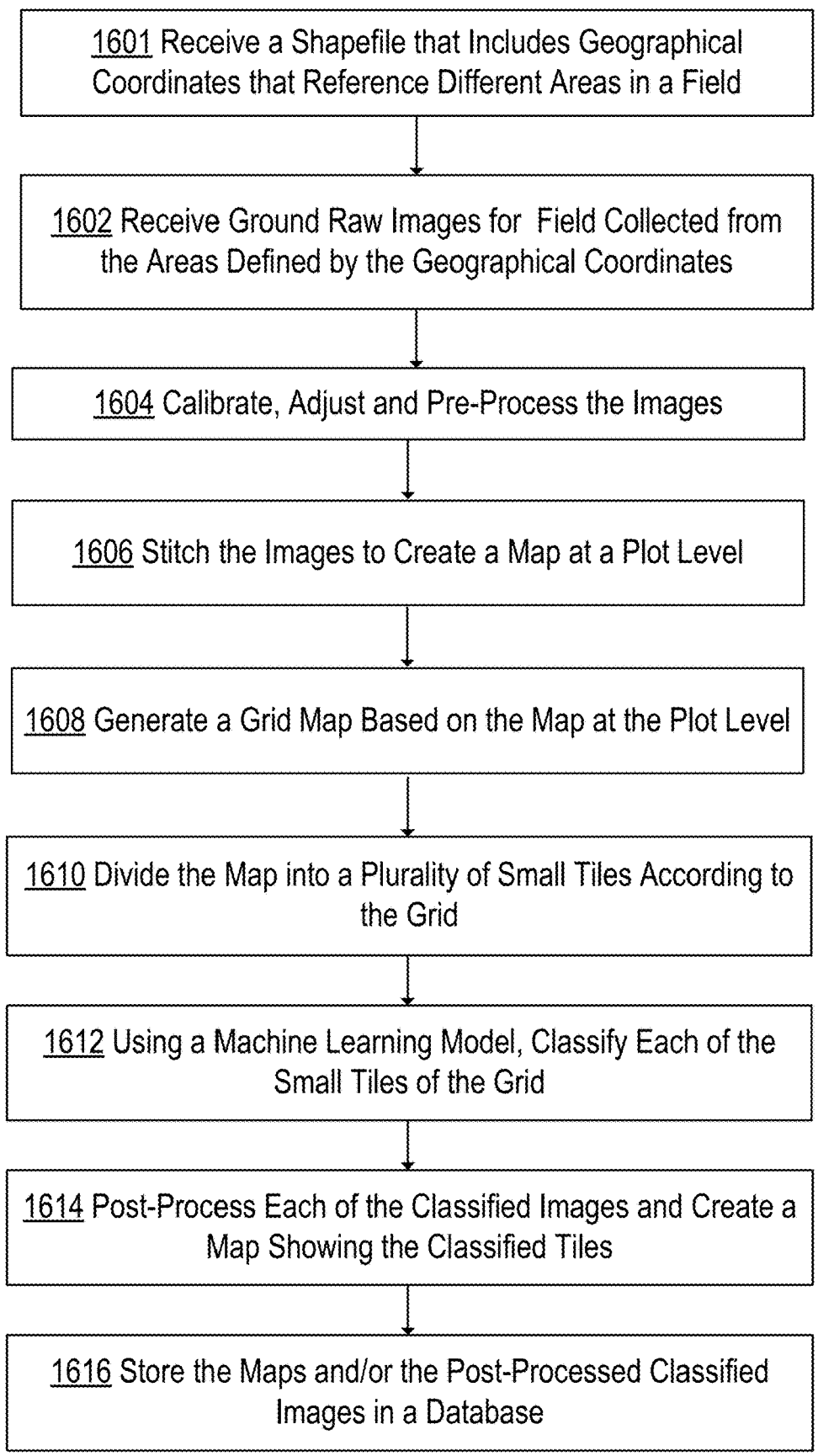
FIG. 16 illustrates an example flow chart for processing ground images to generate a field anomalies map using machine learning models.

FIG. 16 illustrates an example flow chart for processing ground images to generate a field anomalies map using machine learning models. The steps described in FIG. 16 are usually performed by an on-ground system and may utilize advanced hardware technology, such as an Edge TPU. The on-ground processing system may be implemented as a distributed system, as a system on the cloud, a virtual system, or a set of standalone servers.

In step 1601, a processor receives a shapefile that includes geographical coordinates that reference different areas in a field. As described in FIG. 15, the shapefile may include, for example, the geographical coordinates of the regions that are covered with weeds, or the shapefile may include the geographical coordinates of the regions that are covered with trees, and so forth.

In alternative embodiment, the shapefile may include the boundaries of all anomalies, regardless of their type. For example, the shapefile may include coordinates of enclosed regions, and one of those regions may be covered by weeds, another region may be covered by bare soil, and so forth.

In step 1602, the processor receives ground raw images for a field. The images may be collected from the areas defined by the geographical coordinates. As described before, the shapefile may be sent to the on-ground vehicles, such as harvesters, combines, tractors, and the like. Alternatively, or in addition to, the shapefile may be sent to on-ground controllers and/or cameras that are attached to physical poles placed throughout the field. The cameras may be triggered or instructed to capture images from different regions. The instructions may provide the geographical coordinates of the particular regions, and the geographic coordinates may be provided in the shapefile. The ground raw images may be, for example, collected by a tractor as the tractor traverses the field, and follows the boundaries provided in a shapefile.

In step 1604, the processor calibrates, adjusts, and pre-processes the raw images. That may include calibrating the color, adjusting the color and hue, saturation, gamma correction, changing the format of the images, and so forth.

In step 1606, the calibrated, adjusted, and pre-processed images are stitched to create a large map at the plot level. A plot level map refers to a small rectangular area inside the field. The small areas may have, for example, a 2-crop-row width and a 20-feet-long length to cover, for example, 0.002 acre. In contrast, a field level map refers to an image that covers a typical large agricultural field having, for example, 40 to 100 acres.

In step 1608, based on the map at the plot level, the processor generates a grid map. Because the grid is generated at a plot level, the grid may not cover smaller areas then the grid generated for aerial and UAV images. For example, for the ground imaging processing, the plot level may be generated based on five to eight images, and they are stitched into one image covering, for instance, 0.002 acre. In contrast, in the aerial/UAV image processing, the stitching included combining several hundreds of images into a large orthomosaic image covering, for example, hectares.

In step 1610, the map is divided into a plurality of small tiles according to the grid.

In step 1612, using a machine learning model, each of the small tiles of the grid is classified. The classification process has been described in previous drawings and may include matching the image of the tile with an image of the classifier. There might be a large set of different classifiers. If a match is found within a certain acceptable probability, then the tile of the grid is classified based on the matching classifier image.

In step 1614, each of the classified images is post-processed to, for example, correct or fill in missing information, and/or correct the classification if the probability is too low. This may also include reclassifying the tile image or performing the classification again.

The post-processed classified images may be used to generate a map showing the classified tiles. Similarly, as in the aerial/UAV image processing in step 1514 of FIG. 15, in step 1614 of FIG. 16, the images may be used to generate separate maps, where each map is for a separate anomaly. For example, one map may be created for an anomaly corresponding to weeds, another map may be created for an anomaly corresponding to trees, and so forth.

One difference between the maps generated in step 1614 of FIG. 16 and the maps generated in step 1514, in FIG. 15, is that the maps generated in step 1614 have a greater level of accuracy and granularity and are for a smaller area that the maps generated in step 1514. The maps generated in step 1614 are more specific, precise, and accurate than the maps that are generated based on the satellite and aerial imagery in step 1514 of FIG. 15.

In step 1616, the post-processed classified images or maps are stored in a database. That may include storing the images in worldwide and/or international data depositories that may be shared between different industries. The images may be also shared between research laboratories and institutions. The images may also be shared among crop growers, farmers, as well as industries responsible for manufacturing seeds, crops, fertilizers, and agricultural machinery.

13. Benefits of Certain Embodiments

Embodiments provide the ability to identify and map specific anomalies in a crop field using high-throughput imagery with common color and multispectral imaging sensors and opportunistically map areas of a field with lost yield by low-cost sensors on ground vehicles. In the approach proposed herein, the use of low-cost sensors combined with machine learning models provides high quality and high precision maps of several sources of anomaly that are scalable to a typical commercial field.

Embodiments presume that a convolutional neural network has been trained, using a large set of digital images of fields as a training set, to identify features of images that are known to represent crop coverage, bare soil, crop damage and weeds. Models may be trained using images that show crops, bare soil, damaged crops and weeds, in varying proportions, with manual labeling of the meaning of the image.

What is claimed is:

1. A computer-implemented method for generating an improved map of field anomalies using digital images and machine learning models, the method comprising:
    obtaining a shapefile that defines boundaries of an agricultural plot;
    based on the shapefile, obtaining a plurality of ground based plot images from one or more image capturing devices mounted at a fixed ground location or a ground vehicle at the agricultural plot;
    calibrating the plurality of ground based plot images;
    stitching the plurality of calibrated ground based plot images into a plot map of the agricultural plot at a plot level;
    generating a plot grid;
    based on the plot grid and the plot map, defining a plurality of plot tiles for the agricultural plot, each of the plurality of plot tiles including multiple pixels of the plurality of calibrated ground based plot images;
    classifying the plurality of plot tiles, using a first machine learning model and a plurality of first image classifiers corresponding to one or more first anomalies, into a set of classified plot images that depicts at least one anomaly, wherein each of the plurality of plot tiles is classified into classifications at least corresponding to a crop, a weed, trees, and inter-row damage;
    determining, for each image in the set of classified plot images, a probability that the image is correctly classified, and further comparing the probability to an acceptable probability;
    based on the set of classified plot images, generating a plot anomaly map for the agricultural plot; and
    transmitting the plot anomaly map to one or more controllers that control one or more agricultural machines to perform agricultural functions on the agricultural plot.

2. The computer-implemented method of claim 1, wherein the shapefile is generated by performing:
    obtaining a plurality of aerial images of an agricultural field;
    calibrating the plurality of aerial images stitching the plurality of calibrated aerial images into a field map of the agricultural field at a field level;
    based on the field map of the agricultural field, generating a field grid;
    based on the field grid and the field map, defining a plurality of field tiles;
    classifying the plurality of field tiles, using a second machine learning model and a plurality of second image classifiers corresponding to one or more second anomalies, into a set of classified field images that depicts at least one field anomaly;
    based on the set of classified field images, generating a field anomaly map for the agricultural field; and
    based on the field anomaly map, generating the boundaries for the agricultural plot defined in the shapefile.

3. The computer-implemented method of claim 2, wherein the agricultural plot is a part of the agricultural field.

4. The computer-implemented method of claim 2, wherein the plot anomaly map has a higher-level of detail than the field anomaly map;
    wherein the plurality of first image classifiers has a higher-level of detail than the plurality of second image classifiers; and
    wherein the plurality of first image classifiers includes two or more of: one or more interrow image classifiers, one or more weed image classifiers, one or more bare soil classifiers, one or more lodging classifiers, or one or more standing water classifiers; and
    wherein the one or more first anomalies have a higher-level of detail than the one or more second anomalies.

5. The computer-implemented method of claim 1, wherein the shapefile is used to control the one or more image capturing devices configured to capture the plurality of ground based plot images from the agricultural plot defined by the boundaries.

6. The computer-implemented method of claim 1, wherein the plurality of ground based plot images is captured by the one or more image capturing devices as the one or more image capturing devices are controlled based on contents of the shapefile specifying the boundaries of the agricultural plot.

7. The computer-implemented method of claim 1, wherein the one or more image capturing devices are installed on any of: moving farming equipment, stationary farming equipment, stationary posts, stationary structures, handheld devices, or mobile devices.

8. The computer-implemented method of claim 1, wherein the calibrating of the plurality of ground based plot images comprises correcting one or more colors depicted in the plurality of ground based plot images.

9. The computer-implemented method of claim 1, wherein the plot anomaly map for the agricultural plot comprises one or more specific anomaly maps, each specific anomaly map depicting a specific anomaly identified for the agricultural plot.

10. One or more non-transitory storage media storing instructions which, when executed by one or more computing devices, cause the one or more computing devices to perform:
    obtaining a shapefile that defines boundaries of an agricultural plot;

based on the shapefile, obtaining a plurality of ground based plot images from one or more image capturing devices mounted at a fixed ground location or a ground vehicle at the agricultural plot;

calibrating the plurality of ground based plot images;

stitching the plurality of calibrated ground based plot images into a plot map of the agricultural plot at a plot level;

generating a plot grid;

based on the plot grid and the plot map, defining a plurality of plot tiles for the agricultural plot, each of the plurality of plot tiles including multiple pixels of the plurality of calibrated ground based plot images;

classifying the plurality of plot tiles using a first machine learning model and a plurality of first image classifiers corresponding to one or more first anomalies, into a set of classified plot images that depicts at least one anomaly, wherein each of the plurality of plot tiles is classified into classifications at least corresponding to a crop, a weed, trees, and inter-row damage;

determining, for each image in the set of classified plot images, a probability that the image is correctly classified, and further comparing the probability to an acceptable probability;

based on the set of classified plot images, generating a plot anomaly map for the agricultural plot; and transmitting the plot anomaly map to one or more controllers that control one or more agricultural machines to perform agricultural functions on the agricultural plot.

11. The one or more non-transitory storage media of claim 10, storing additional instructions for generating the shapefile, which, when executed by the one or more computing devices, cause the one or more computing devices to perform:

obtaining a plurality of aerial images of an agricultural field;

calibrating the plurality of aerial images stitching the plurality of calibrated aerial images into a field map of the agricultural field at a field level;

based on the field map of the agricultural field, generating a field grid;

based on the field grid and the field map, defining a plurality of field tiles;

classifying the plurality of field tiles using a second machine learning model and a plurality of second image classifiers corresponding to one or more second anomalies, into a set of classified field images that depicts at least one field anomaly;

based on the set of classified field images, generating a field anomaly map for the agricultural field; and based on the field anomaly map, generating the boundaries for the agricultural plot defined in the shapefile.

12. The one or more non-transitory storage media of claim 11, wherein the agricultural plot is a part of the agricultural field.

13. The one or more non-transitory storage media of claim 11, wherein the plot anomaly map has a higher-level of detail than the field anomaly map;

wherein the plurality of first image classifiers has a higher-level of detail than the plurality of second image classifiers; and wherein the plurality of first image classifiers includes two or more of: one or more interrow image classifiers, one or more weed image classifiers, one or more bare soil classifiers, one or more lodging classifiers, or one or more standing water classifiers; and wherein the one or more first anomalies have a higher-level of detail than the one or more second anomalies.

14. The one or more non-transitory storage media of claim 10, wherein the shapefile is used to control the one or more image capturing devices configured to capture the plurality of ground based plot images from the agricultural plot defined by the boundaries.

15. The one or more non-transitory storage media of claim 10, wherein the plurality of ground based plot images is captured by the one or more image capturing devices as the one or more image capturing devices are controlled based on contents of the shapefile specifying the boundaries of the agricultural plot.

16. The one or more non-transitory storage media of claim 10, wherein the one or more image capturing devices are installed on any of: moving farming equipment, stationary farming equipment, stationary posts, stationary structures, handheld devices, or mobile devices.

17. The one or more non-transitory storage media of claim 10, wherein the calibrating of the plurality of ground based plot images comprises correcting one or more colors depicted in the plurality of ground based plot images.

18. The one or more non-transitory storage media of claim 10, wherein the plot anomaly map for the agricultural plot comprises one or more specific anomaly maps, each specific anomaly map depicting a specific anomaly identified for the agricultural plot.

* * * * *